United States Patent
Kamiya

(10) Patent No.: US 10,092,840 B2
(45) Date of Patent: Oct. 9, 2018

(54) GAME CONTROL DEVICE, GAME SYSTEM, AND INFORMATION STORAGE MEDIUM

(71) Applicant: KONAMI DIGITAL ENTERTAINMENT CO., LTD., Tokyo (JP)

(72) Inventor: Masayasu Kamiya, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 424 days.

(21) Appl. No.: 14/810,498

(22) Filed: Jul. 28, 2015

(65) Prior Publication Data
US 2016/0030846 A1   Feb. 4, 2016

(30) Foreign Application Priority Data

Jul. 29, 2014   (JP) ................. 2014-154323

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2018.01) |
| *A63F 13/537* | (2014.01) |
| *A63F 13/812* | (2014.01) |
| *A63F 13/30* | (2014.01) |

(52) U.S. Cl.
CPC ............ *A63F 13/537* (2014.09); *A63F 13/30* (2014.09); *A63F 13/812* (2014.09)

(58) Field of Classification Search
USPC ..................... 463/1, 20, 22, 31, 39
See application file for complete search history.

(56) References Cited

U.S. PATENT DOCUMENTS

| | | | |
|---|---|---|---|
| 5,708,787 A | * | 1/1998 | Nakano ................. G06F 3/0482 715/837 |
| 6,082,887 A | * | 7/2000 | Feuer .................. G07F 17/3258 700/91 |
| 6,585,600 B1 | | 7/2003 | Nakagawa et al. |

(Continued)

FOREIGN PATENT DOCUMENTS

| | | |
|---|---|---|
| JP | 2000-317137 A | 11/2000 |
| JP | 2001-120704 A | 5/2001 |

OTHER PUBLICATIONS

Office Action dated Jul. 10, 2018, for corresponding JP Patent Application No. 2014-154323 and Computer generated English translation thereof.

*Primary Examiner* — Adetokunbo O Torimiro

(74) *Attorney, Agent, or Firm* — HEA Law PLLC

(57) ABSTRACT

A first display control unit displays an item selecting screen, which receives a selection of at least one of a plurality of items, on a display unit. A second display control unit displays a setting screen on the display unit in response to a first operation for selecting at least one of the items in a case where the item selecting screen is being displayed, the setting screen receiving a change of content of the selected item. The item selecting screen includes an area displaying information on content of a specified item among the plurality of items. A change control unit changes the content of the specified item displayed on the area in response to a second operation that is different from the first operation, in a case where the item selecting screen is being displayed.

8 Claims, 17 Drawing Sheets

(56) References Cited

U.S. PATENT DOCUMENTS 9,772,743 B1\* 9/2017 Mueller .............. G06F 3/04812
2015/0019981 A1\* 1/2015 Petitt, Jr. ............. G06F 3/04842
　　　　　　　　　　　　　　　　　　　　　　　715/738

\* cited by examiner

FIG.7

TBL100

| STADIUM ID | STADIUM NAME | IMAGE | PRIORITY |
|---|---|---|---|
| S1 | STADIUM A | S1.jpg | 1 |
| S2 | STADIUM B | S2.jpg | 2 |
| S3 | STADIUM C | S3.jpg | 3 |

FIG.12

TBL101

| ITEM | | CONTENT |
|---|---|---|
| BALL TYPE | | B1 |
| GAME PLAN | | P3 |
| UNIFORM TYPE | | U4 |
| STADIUM | STADIUM ID | S1 |
| | TIME ZONE | NIGHT |
| | SEASON | WINTER |
| | WEATHER | RAIN |
| | LENGTH OF LAWN | SHORT |
| | PITCH CONDITION | DRY |
| CAMERA TYPE | | C1 |
| ... | | ... |

GAME CONTROL DEVICE, GAME SYSTEM, AND INFORMATION STORAGE MEDIUM

CROSS-REFERENCE TO RELATED APPLICATION

The present application claims priority from Japanese application JP2014-154323 filed on Jul. 29, 2014, the content of which is hereby incorporated by reference into this application.

BACKGROUND OF THE INVENTION

1. Field of the Invention

The present invention relates to a game control device, a game system, and an information storage medium.

2. Description of the Related Art

A game has been known that enables a user to change items regarding execution of the game (e.g., JP2000-317137A). For example, in a soccer game, a user can change content of items, such as game venue (stadium), uniform, ball, formation, starting players, and tactics, from predetermined content to desired content. In such a soccer game, the game is executed in accordance with the content changed by the user.

In the game discussed above, operations that the user performs in order to change content of items are described as follows. That is, when the user selects at least one item on a menu screen where a plurality of items are displayed, a setting screen for changing the selected item is displayed. The user changes content of the selected item on the setting screen. When the change is completed, the screen returns to the menu screen. When changing other items, the user repeats this processing.

SUMMARY OF THE INVENTION

In the game discussed above, in order to change content of an item, the user displays the setting screen by selecting the desired item on the menu screen, then needs to return to the menu screen after changing the content on the setting screen. In other words, in order to change content of the item, the user needs to perform operations for displaying the setting screen and then returning to the menu screen. As such, if the number of items to set is increased, the number of operations that the user needs to perform is greatly increased.

One or more embodiments of the present invention have been conceived in view of the above, and an object thereof is to provide a game control device, a game system, and an information storage medium capable of reducing the number of operations that a user needs to perform when changing content of an item.

In order to solve the above described problems, a game control device according to the present invention includes a first display control unit configured to display an item selecting screen, which receives a selection of at least one of a plurality of items, on a display unit, and a second display control unit configured to display a setting screen on the display unit in response to a first operation for selecting at least one of the items in a case where the item selecting screen is being displayed, the setting screen receiving a change of content of the selected item. The item selecting screen includes an area displaying information on content of a specified item among the plurality of items. The game control device further includes a change control unit configured to change the content of the specified item displayed on the area in response to a second operation different from the first operation, in a case where the item selecting screen is being displayed.

A game system according to the present invention includes a first display control unit configured to display an item selecting screen, which receives a selection of at least one of a plurality of items, on a display unit, and a second display control unit configured to display a setting screen on the display unit in response to a first operation for selecting at least one of the items in a case where the item selecting screen is being displayed, the setting screen receiving a change of content of the selected item. The item selecting screen includes an area displaying information on content of a specified item among the plurality of items. The game control device further includes a change control unit configured to change the content of the specified item displayed on the area in response to a second operation different from the first operation, in a case where the item selecting screen is being displayed.

A computer-readable information storage medium according to the present invention storing a program that causes a computer to display an item selecting screen, which receives a selection of at least one of a plurality of items, on a display unit and display a setting screen on the display unit in response to a first operation for selecting at least one of the items in a case where the item selecting screen is being displayed, the setting screen receiving a change of content of the selected item. The item selecting screen includes an area displaying information on content of a specified item among the plurality of items. The program causes the computer to change the content of the specified item displayed on the area in response to a second operation different from the first operation, in a case where the item selecting screen is being displayed.

BRIEF DESCRIPTION OF THE DRAWINGS

FIG. 7 is a diagram illustrating an example of information associated with stadiums.

FIG. 12 is a diagram illustrating an example of a setting content table.

DETAILED DESCRIPTION OF THE INVENTION

Figure 1:
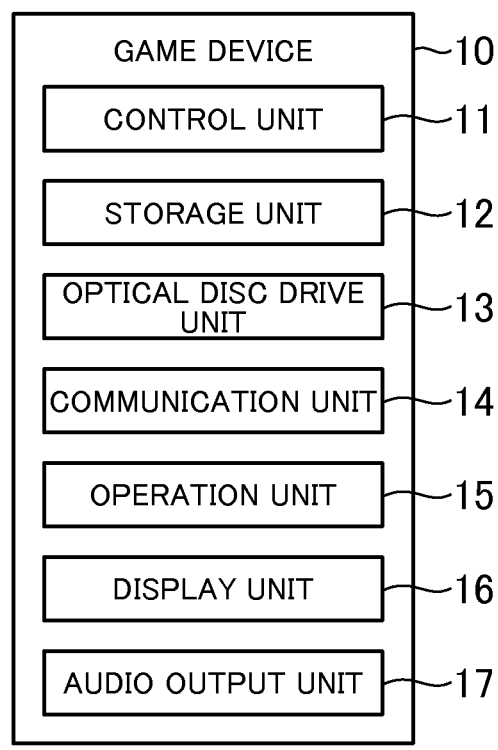
FIG. 1 is a diagram illustrating a structure of a game device.

An embodiment of the present invention will be described below in detail with reference to the accompanying drawings. In the drawings, identical or corresponding elements are designated with the same numerals, and their overlapping explanations may be omitted as appropriate.

[1. Configuration Of Game Device]

FIG. 1 is a diagram illustrating a configuration of a game device 10 according to an embodiment of the present invention.

The game device 10 is a computer that is used by a user to play a game. The game device 10 is implemented by, for example, a home-use game machine (non-portable game machine), a portable game machine, a commercial game machine, a mobile phone including smartphone, a mobile information terminal including tablet computer, a desktop computer, and a laptop computer. The game device 10 corresponds to an example of game control devices.

FIG. 1 is a diagram illustrating a hardware configuration of the game device 10. As shown in FIG. 1, the game device 10 includes a control unit 11, a storage unit 12, an optical disc drive unit 13, a communication unit 14, an operation unit 15, a display unit 16, and an audio output unit 17. The optical disc drive unit 13, the communication unit 14, the operation unit 15, the display unit 16, and the audio output unit 17 may not be contained in the game device 10, and may be external devices connected to the game device 10.

The control unit 11 includes, for example, one or more microprocessors, and executes processing according to an operating system and other programs. The storage unit 12 includes a main storage unit (e.g., RAM) and an auxiliary storage unit (e.g., hard disk drive or solid state drive). The optical disc drive unit 13 reads programs and data stored in an optical disc. The communication unit 14 is a unit for data communications through a communication network.

For example, programs and data are provided to the game device 10 through optical discs. The game device 10 may not include the optical disc drive unit 13. For example, the game device 10 may include an element for reading a program or data stored in an information storage medium (e.g., memory card) other than an optical disc. The program or data may be provided to the game device 10 through an information storage medium other than an optical disc. Alternatively, for example, the program and data may be remotely provided to the game device 10 through a communication network.

The operation unit 15 is used by a user to operate a game. For example, when the game device 10 is implemented by a home-use game machine, a game controller connected to the home-use game machine corresponds to the operation unit 15. That is, a game controller provided with some operation parts, such as buttons and sticks (levers), corresponds to the operation unit 15.

Figure 2:
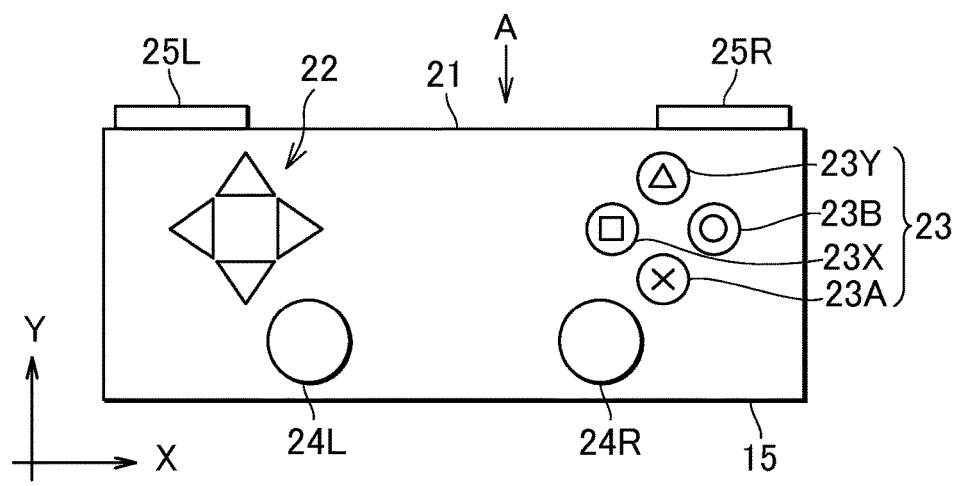
FIG. 2 is a diagram illustrating a top view of a game controller.
Figure 3:
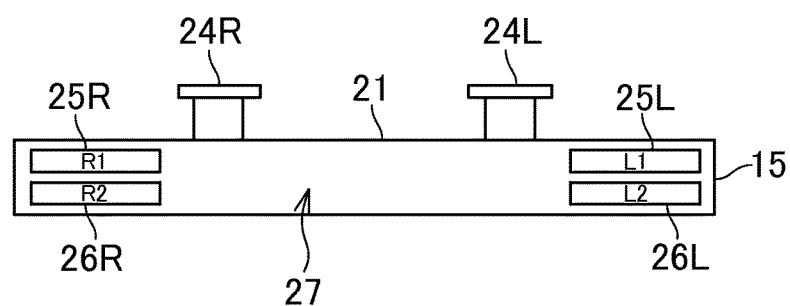
FIG. 3 is a diagram illustrating a rear view of the game controller.

The following explains an example of the game controller 15 based on FIGS. 2 and 3. FIGS. 2 and 3 show examples of an external view of the game controller 15. FIG. 2 shows a top view of the game controller 15, and FIG. 3 shows a rear view (back side view) of the game controller. As shown in FIGS. 2 and 3, the game controller 15 has some operation parts.

Specifically, as shown in FIG. 2, a direction button group 22, a button group 23, a left stick (lever) 24L, and a right stick (lever) 24R are provided on the upper surface of the game controller 15. The direction button group 22 is used for indicating directions, for example. The button group 23 includes buttons 23A, 23B, 23X, and 23Y, and is used for various game operations. The left stick 24L and the right stick 24R are also used for indicating directions, for example. The left stick 24L and the right stick 24R are disposed upright on the upper surface of the game controller 15, and freely tilted to any direction from the upright state.

As shown in FIG. 3, a back side surface 27 of the game controller 15 has buttons 25L, 25R, 26L, and 26R. The back side surface 27 is a surface on the back of the game controller 15 viewed from a user holding the controller. In other words, the back side surface 27 is a surface of the game controller 15 viewed from a direction A shown in FIG. 2. It can also be said that the back side surface 27 is a surface depicted as a rear view when the game controller 15 placed in a direction usually held by a user is depicted in six views. Further, for example, it can also be said that the back side surface 27 is a surface touched by index fingers or middle fingers of a user when the user holds the game controller 15.

The buttons 25L, 25R, 26L, and 26R are also used for various game operations. In the following, the button 25L is referred to as "L1" button, the button 25R is "R1" button, the button 26L is "L2" button, and the button 26R is "R2" button.

The status of each operation part of the game controller 15 is scanned at a certain cycle (e.g., every 1/60 second), and an operation signal indicating a result of the scanning is provided to the control unit 11. The operation of the user is determined based on the operation signal.

The operation unit 15 is not limited to the game controller 15 as shown in FIG. 2. For example, the operation unit 15 may be used by a user to operate a game by voice or gesture.

For example, when the game device 10 is implemented by a portable game machine, and operation parts, which are the same as the operation parts included in the game controller of the home-use game machine, are provided to the portable game machine, these operation parts correspond to the operation unit 15. When the portable game machine has a touch panel, the touch panel also corresponds to the operation unit 15.

For example, when the game device 10 is implemented by a personal computer, a mouse or a keyboard provided to the personal computer corresponds to the operation unit 15.

For example, when the game device 10 is implemented by a mobile phone or a mobile information terminal, the operation unit 15 corresponds to, for example, a key, a stick, or a touch panel provided to the mobile phone or the mobile information terminal.

The display unit 16 is, for example, a liquid crystal panel or an organic EL display, and displays a screen according to an instruction from the control unit 11. The audio output unit 17 is, for examples, speakers or headphones, and outputs audio data according to an instruction from the control unit 11.

[2. Outline Of Game Executed In Game Device 10]

The game device 10 can execute various types of games. In the following, a case is discussed in which the game device 10 executes a soccer game. For example, in this soccer game, a soccer game is performed between a first team operated by a user and a second team operated by an opponent. A computer can be an opponent, and also other users can be an opponent. Further, multiple users can cooperate to operate a first team, and other multiple users can be an opponent. The following explains a case where a soccer game is performed between a first team operated by a user and a second team operated by a computer.

In the above described soccer game, before the soccer game is executed, that is, before the soccer game is started, various settings relating to the game (hereinafter, game settings) are set up. For example, the game settings includes settings of a team operated by the user, a type of a uniform of the team operated by the user, a type of a soccer ball to be used in the game, game plans of the team operated by the user, and a type of a stadium to be used as a game venue.

In the following, an example of game setting processing performed before the start of a soccer game will be explained based on FIGS. 4 to 10.

[2.1. Team Selection Screen]

Figure 4:
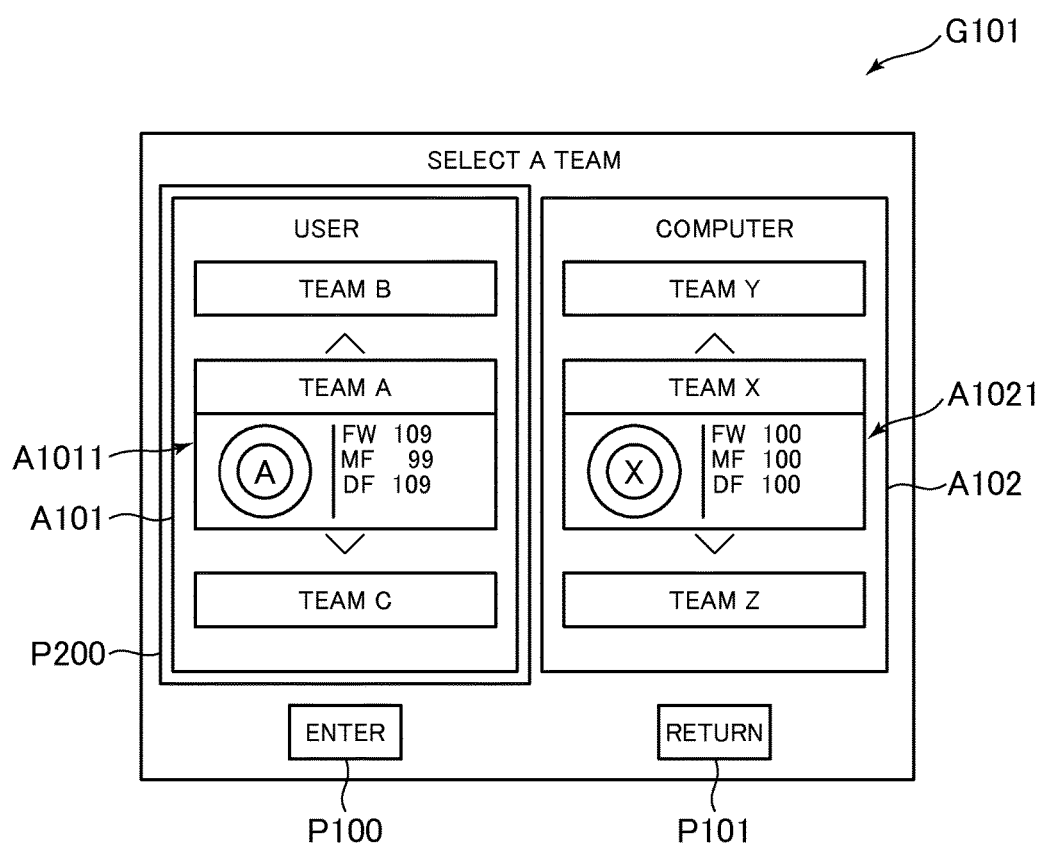
FIG. 4 is a diagram illustrating an example of a team selection screen.

FIG. 4 shows an example of a team selection screen G101. The team selection screen G101 is a screen for selecting a team (first team) that is operated by a user and a team (second team) that is controlled by a computer (opponent).

As shown in FIG. 4, the team selection screen G101 includes a display area A101, a display area A102, a screen element P100, a screen element P101, and a selection frame P200. The selection frame P200 is controlled to move to a position that surrounds any one of the display area A101, the display area A102, the screen element P100, and the screen element P101 in response to an operation to instruct a direction (e.g., up, down, right, left) by the operation unit 15. The operation to instruct a direction is received by, for example, the direction button group 22 or the left stick 24L of the game controller 15.

The display area A101 is an area that displays information for selecting a team (first team) that the user operates. For example, in the display area A101, a team displayed in the display area A1011 indicates that the team is selected as a candidate of the team (first team) to be operated by the user. When an operation to instruct up or down direction using the operation unit 15 is performed in a state where the selection frame P200 selects the display area A101 (i.e., state where the display area A101 is surrounded by the selection frame P200), the team displayed on the display area A1011 is switched to another team. That is, the candidate of the team (first team) to be operated by the user is switched to another candidate.

The display area A102 is an area that displays information for selecting a team (second team) to be controlled by the computer (opponent). For example, in the display area A102, a team displayed in the display area A1021 indicates that the team is selected as a candidate of the team (second team) to be controlled by the computer (opponent). When an operation to instruct up or down direction using the operation unit 15 is performed in a state where the selection frame P200 selects the display area A102 (i.e., state where the display area A102 is surrounded by the selection frame P200), the team displayed on the display area A1021 is switched to another team. That is, the candidate of the team (second team) to be controlled by the computer (opponent) is switched to another candidate.

In this regard, "screen element" is an image or a mark associated with processing. Specifically, an icon is an example of "screen element." For example, the screen element P100 is an icon associated with the processing for determining the first team and the second team as displayed on the team selection screen G101. For example, when a predetermined determining operation (e.g., pressing a button 23B) is made with the operation unit 15 in a state where the screen element P100 is selected (i.e., being surrounded by the selection frame P200), the first team and the second team are determined as displayed on the team selection screen G101.

The screen element P101 is an icon associated with the processing for returning to the previous screen. For example, when a predetermined determining operation (e.g., pressing a button 23B) is made with the operation unit 15 in a state where the screen element P101 is selected (i.e., being surrounded by the selection frame P200), the team selection screen G101 is controlled to return to the previous screen. For example, the screen previous to the team selection screen G101 may be a screen for selecting a user or a computer that operates (controls) the first team and the second team, respectively.

Next, referring to FIG. 5, an example of the team selection screen G101 of FIG. 4 displayed when the screen element P100 is selected will be explained.

[2.2. Setting Menu Screen]

Figure 5:
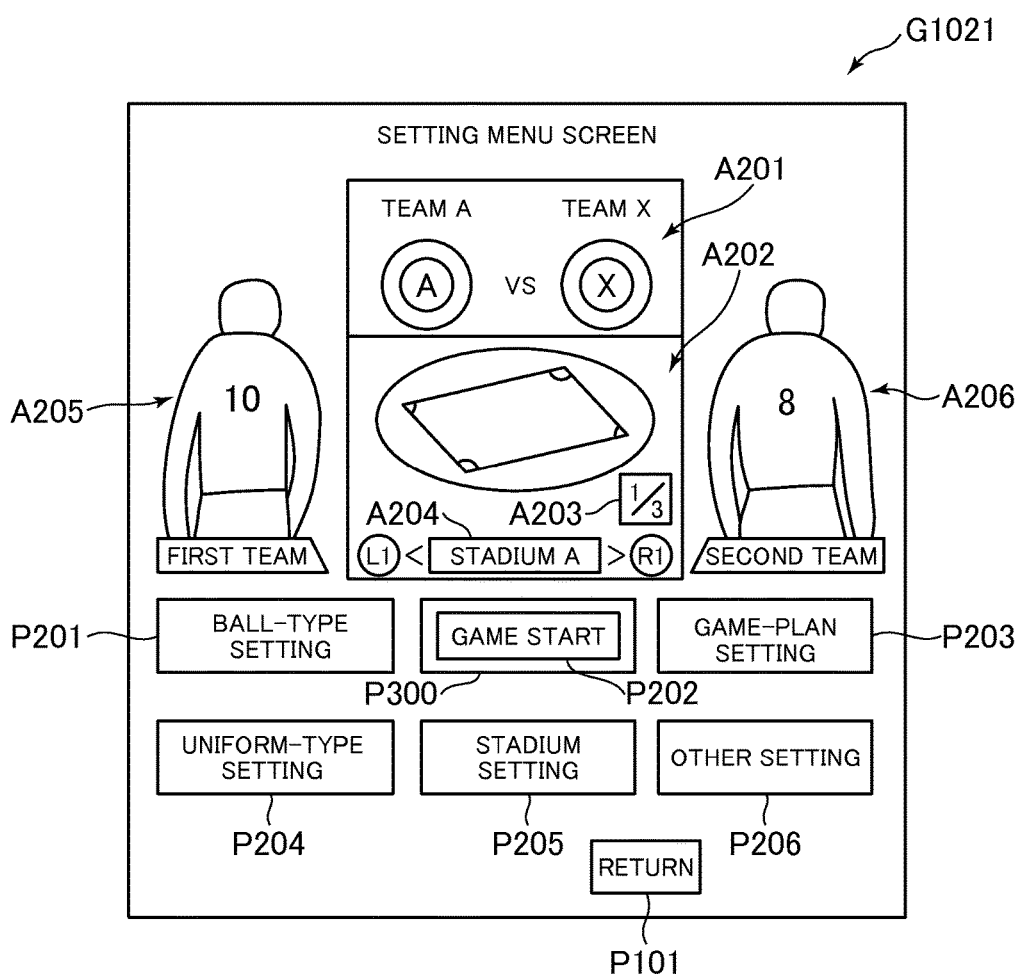
FIG. 5 is a diagram illustrating an example of a setting menu screen.

FIG. 5 shows an example of a setting menu screen G1021 for settings related to a game between the first team and the second team. In this regard, "settings related to a game" means setting up information necessary for executing a game, for example, a stadium to be used in the game, a soccer ball to be used in the game, a uniform to be used in the game, tactics of the team for the game, and camera work for the game. For "settings related to a game", the settings used in the previously executed game, for example, may be set as initial settings.

In the example shown in FIG. 5, the setting menu screen G1021 includes screen elements P201 to P206, a screen element P101, display areas A201 to A206, and a selection frame P300. The selection frame P300 is controlled to move to a position that surrounds one of the screen element P101 and the screen elements P201 to P206 in response to an operation to instruct directions (e.g., up, down, left, right) with the operation unit 15. For example, in the initial state, the selection frame P300 is at the position to surround the screen element P202. The operation to instruct the direction is received at, for example, the direction button group 22 or the left stick 24L of the game controller 15.

The screen element P201 is an icon associated with processing for displaying a screen (ball type setting screen) for setting a type of a soccer ball to be used in the game. For example, when the screen element P201 is selected, the ball type setting screen is displayed on the display unit 16. For example, the screen displayed on the display unit 16 is switched from the setting menu screen G1021 to the ball type setting screen. Further, for example, the ball type setting screen is displayed to overlap the setting menu screen G1021. In the above example, the screen element P201 may be selected by performing a determining operation (e.g., pressing the button 23B) with the operation unit 15 in a state where the screen element P201 is selected (i.e., being surrounded by the selection frame P300).

For example, a soccer ball to be used in the game can be selected from a plurality of types of soccer balls on the ball type setting screen. The soccer game may have variations of not only shapes and patterns but also trajectories and bounces of shot or passed balls for each type of soccer balls.

When the setting of a type of soccer ball is completed on the ball type setting screen, the ball type setting screen disappears from the display unit 16, and the setting menu screen G1021 is displayed on the display unit 16. For example, the screen displayed on the display unit 16 is switched from the ball type setting screen to the setting menu screen G1021 again. Further, for example, the ball type setting screen that is displayed to overlap the setting menu screen G1021 is controlled to disappear.

The screen element P203 is an icon associated with processing for displaying a screen (game plan setting screen) for setting tactics of the team operated by the user. For example, when the screen element P203 is selected, the game plan setting screen is displayed on the display unit 16. For example, the screen displayed on the display unit 16 is switched from the setting menu screen G1021 to the game plan setting screen. Further, for example, the game plan setting screen is displayed to overlap the setting menu screen G1021. In the above example, the screen element P203 may be selected by performing a predetermined determining operation (e.g., pressing the button 23B) with the operation unit 15 in a state where the screen element P203 is selected (i.e., being surrounded by the selection frame P300).

For example, tactics of the team (e.g., formation and players of the team) can be set on the game plan setting screen. When the setting of the tactics of the team is completed on the game plan setting screen, the game plan setting screen disappears from the display unit 16 and the setting menu screen G1021 is displayed on the display unit 16. For example, the screen displayed on the display unit 16 is switched from the game plan setting screen to the setting menu screen G1021 again. Further, for example, the game plan setting screen that is displayed to overlap the setting menu screen G1021 is controlled to disappear.

The screen element P204 is an icon associated with processing for displaying a screen (uniform type setting screen) for setting a type of uniform that players wear in the game. For example, when the screen element P204 is selected, the uniform type setting screen is displayed on the display unit 16. For example, the screen displayed on the display unit 16 is switched from the setting menu screen G1021 to the uniform type setting screen. Further, for example, the uniform type setting screen is displayed to overlap the setting menu screen G1021. In the above example, the screen element P204 may be selected by performing a predetermined determining operation (e.g., pressing the button 23B) with the operation unit 15 in a state where the screen element P204 is selected (i.e., being surrounded by the selection frame P300).

For example, a combination of uniforms of the competing first team and second team can be selected from a plurality of types of uniforms on the uniform type setting screen. When the setting of the uniform type is completed on the uniform type setting screen, the uniform type setting screen disappears from the display unit 16, and the setting menu screen G1021 is displayed on the display unit 16. For example, the screen displayed on the display unit 16 is switched from the uniform type setting screen to the setting menu screen G1021 again. Further, for example, the uniform type setting screen that is displayed to overlap the setting menu screen G1021 is controlled to disappear.

The screen element P206 is an icon associated with processing for displaying a screen (hereinafter, other setting screen) for performing other settings related to the game. For example, when the screen element P206 is selected, the other setting screen is displayed on the display unit 16. For example, the screen displayed on the display unit 16 is switched from the setting menu screen G1021 to the other setting screen. Further, for example, the other setting screen is displayed to overlap the setting menu screen G1021. In the above example, the screen element P206 may be selected by performing a predetermined determining operation (e.g., pressing the button 23B) with the operation unit 15 in a state where the screen element P206 is selected (i.e., being surrounded by the selection frame P300).

For example, it is possible to set a virtual camera, which is a viewpoint set in a virtual three-dimensional space, on the other setting screen. For example, in the soccer game described above, when the soccer game starts, a virtual three-dimensional space is constructed in the storage unit 12 to generate a game screen during the game, and the game screen that shows the virtual three-dimensional space viewed from the virtual camera (viewpoint) set in the virtual three-dimensional space is displayed on the unit 16. For example, a type of virtual camera can be selected on the other setting screen. For example, it is possible to select one of a plurality types of virtual cameras, such as a virtual camera for viewing a pitch (field), in which the soccer game is performed, from the stadium, a virtual camera for viewing the pitch from direct above, and a virtual camera for viewing the pitch from viewpoints of players.

When the settings on the other setting screen are completed, the other setting screen disappears from the display unit 16, and the setting menu screen G1021 is displayed on the display unit 16. For example, the screen displayed on the display unit 16 is switched from the other setting screen to the setting menu screen G1021 again. Further, for example, the other setting screen displayed to overlap the setting menu screen G1021 is controlled to disappear.

The screen element P205 is an icon associated with processing for displaying a screen (stadium setting screen) for setting a stadium to be used as a game venue. For example, when the screen element P205 is selected, the stadium setting screen is displayed on the display unit 16. For example, the screen displayed on the display unit 16 is switched from the setting menu screen G1021 to the stadium setting screen. Further, for example, the stadium setting screen is displayed to overlap the setting menu screen G1021. In the above example, the screen element P205 may be selected by performing a predetermined determining operation (e.g., pressing the button 23B) with the operation unit 15 in a state where the screen element P205 is selected (i.e., being surrounded by the selection frame P300).

[2.3. Stadium Setting Screen]

Figure 6:
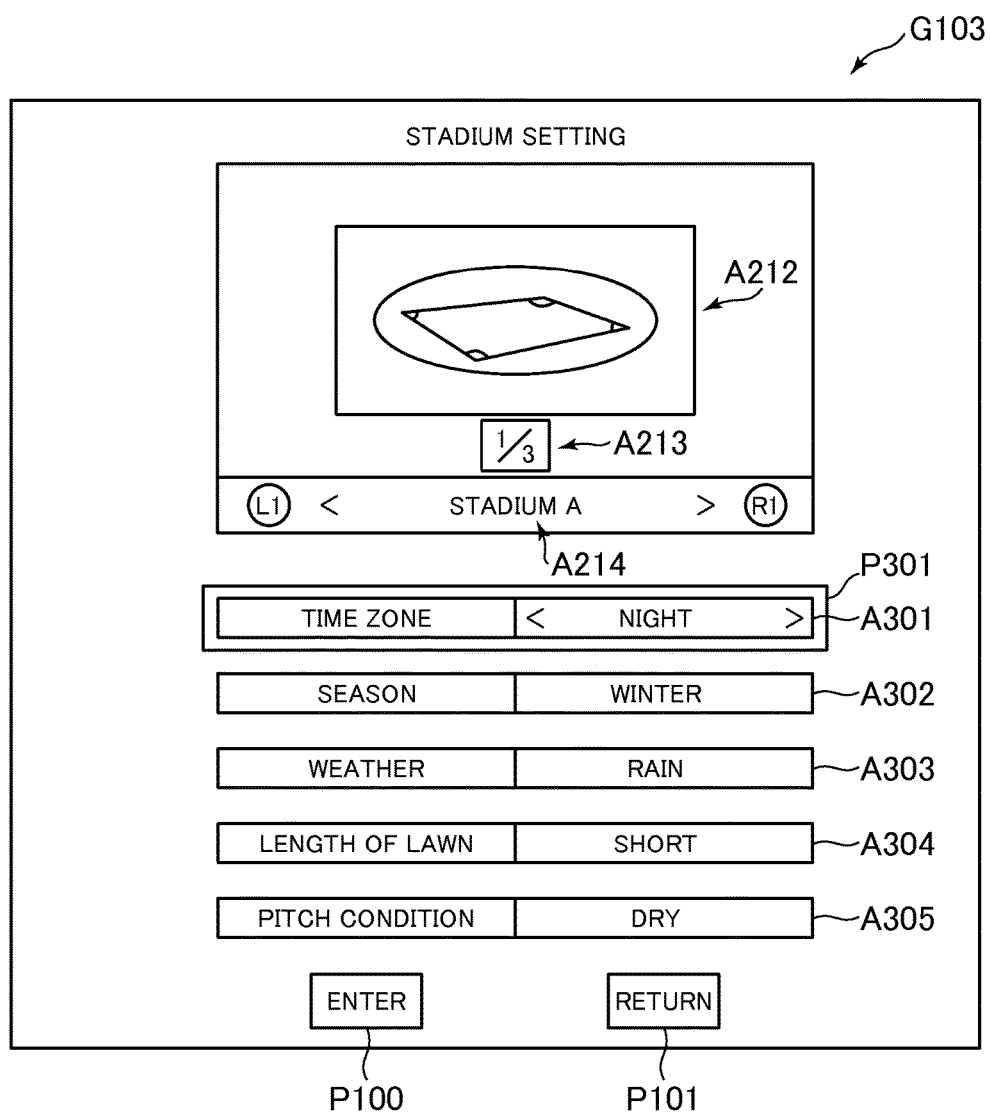
FIG. 6 is a diagram illustrating an example of a stadium setting screen.

FIG. 6 shows an example of the stadium setting screen G103. For example, it is possible to select a stadium to be used as a game venue and set conditions of the stadium on the stadium setting screen G103. As shown in FIG. 6, the stadium setting screen G103 displays display areas A212 to A214, display areas A301 to A305, a selection frame P301, and screen elements P100 and P101. The selection frame P301 is controlled to move to a position that surrounds one of the display areas A301 to A305, the screen element P100, and the screen element P101 in response to an operation to instruct directions (e.g., up, down, left, right) with the operation unit 15. The operation to instruct directions is received at, for example, the direction button group 22 or the left stick 24L of the controller 15.

First, an example of information associated with the stadium will be described based on a stadium information table TBL100 shown in FIG. 7, before the detailed description of stadium setting screen G103 is discussed. As shown in FIG. 7, the stadium information table TBL100 stores information on items of "stadium name" indicating stadium names, "image" indicating image data of stadiums, and "priority" indicating priorities of display of stadiums, in association with stadium IDs for identifying the stadiums. For example, the stadium information table TBL100 may be stored in an optical disc to be read by the storage unit 12 of the optical disc drive unit 13. For example, when a soccer game is executed for the first time, a stadium having the first "priority" is initially selected as a game venue. Next, returning to FIG. 6, the detail of the stadium setting screen G103 will be discussed.

The display area A212 in FIG. 6 is an area for displaying an image of the stadium currently selected as the game venue. For example, if a stadium ID of the currently selected stadium is "S1", the display area A212 displays an image that is specified by "S1.jpg."

The display area A213 in FIG. 6 is an area for displaying a priority of the stadium currently selected as the game venue. The display area A213 displays the priority of the currently selected stadium and the total number of selectable stadiums ("3" in the example of FIG. 6). For example, the display area A213 displays "priority of the currently selected stadium"/"total number of selectable stadiums." For example, if a stadium ID of the currently selected stadium is "S1 ", the display area A213 displays "1 (priority of the currently selected stadium)/3 (total number of selectable stadiums)."

The display area A214 in FIG. 6 is an area for displaying a name of stadium currently selected as the game venue. For example, if a stadium ID of the currently selected stadium is "S1", the display area A214 displays text information of "stadium A."

For example, when a predetermined button is pressed in a state where the stadium setting screen G103 is displayed, the stadium selected as the game venue is changed. For example, the stadium selected as the game venue is switched to another one by pressing "R1" button (button 25R) or the "L1" button (button 25L).

For example, when the "R1" button is pressed in a state where the stadium having the priority "i" is selected as the game venue, the stadium selected as the game venue is switched from the stadium having the priority "i" to the stadium having the priority "i+1." Here, if there is no stadium having the priority "i+1", the stadium selected as the game venue is switched to the stadium having the priority "1."

For example, when the "L1" button is pressed in a state where the stadium having the priority "i" is selected as the game venue, the stadium selected as the game venue is switched from the stadium having the priority "i" to the stadium having the priority "i-1." Here, if there is no stadium having the priority "i-1", the stadium selected as the game venue is switched to the stadium having the priority "N." In the above example, the "N" is the total number of selectable stadiums. In other words, the "N" is the maximum value of priorities.

When the stadium selected as the game venue is switched to another one, information on the display areas A212 to A214 is updated so as to correspond to the stadium newly selected as the game venue.

The setting area A301 is an area for setting time zone where the game is performed. For example, when an operation to instruct left or right direction is made using the operation unit 15 in a state where the setting area A301 is selected by the selection frame P301 (i.e., being surrounded by the selection frame P301), information on the time zone (e.g., night, day) displayed on the setting area A301 is switched to another one.

The setting area A302 is an area for setting a season when the game is performed. For example, when an operation to instruct left or right direction is made using the operation unit 15 in a state where the setting area A302 is selected by the selection frame P301 (i.e., being surrounded by the selection frame P301), information on the season (e.g., spring, summer, fall, winter) displayed on the setting area A302 is switched to another one.

The setting area A303 is an area for setting the weather when the game is performed. For example, when an operation to instruct left or right direction is made using the operation unit 15 in a state where the setting area A303 is selected by the selection frame P301 (i.e., being surrounded by the selection frame P301), information on the weather (e.g., rain, fine, cloudy) displayed on the setting area A303 is switched to another one.

The setting area A304 is an area for setting a length of lawn of the pitch where the game is performed. For example, when an operation to instruct left or right direction is made using the operation unit 15 in a state where the setting area A304 is selected by the selection frame P301 (i.e., being surrounded by the selection frame P301), information on the length of lawn (e.g., short, normal, long) displayed on the setting area A304 is switched to another one.

The setting area A305 is an area for setting conditions of the pitch where the game is performed. For example, when an operation to instruct left or right direction is made using the operation unit 15 in a state where the setting area A305 is selected by the selection frame P301 (i.e., being surrounded by the selection frame P301), information on the pitch condition (e.g., dry, normal, wet) displayed on the setting area A305 is switched to another one.

The screen element P100 is an icon associated with processing for determining setting information of the stadium as displayed on the stadium setting screen G103. For example, when a predetermined determining operation (e.g., pressing a button 23B) is made with the operation unit 15 in a state where the screen element P100 is selected (i.e., being surrounded by the selection frame P301), the setting information of the stadium is updated in accordance with the current display of the stadium setting screen G103. After the screen element P100 is selected, the setting menu screen G1021 is displayed again. In other words, the stadium setting screen G103 disappears from the display unit 16, and the setting menu screen G1021 is displayed on the display unit 16. For example, the screen displayed on the display unit 16 is switched from the stadium setting screen G103 to the setting menu screen G1021 again. Further, for example, the stadium setting screen G103 displayed to overlap the setting menu screen G1021 is controlled to disappear.

The screen element P101 is an icon associated with processing for returning to the previous screen. For example, when a predetermined determining operation (e.g., pressing a button 23B) is made with the operation unit 15 in a state where the screen element P101 is selected (i.e., being surrounded by the selection frame P301), the stadium setting screen G103 returns to the previous screen (i.e., the setting menu screen G1021). In other words, similarly to the case where the screen element P100 is selected, the stadium setting screen G103 disappears from the display unit 16, and the setting menu screen G1021 is displayed on the display unit 16. In this regard, if the screen element P101 is selected, the setting information of the stadium is not updated and the current setting information is maintained.

[2.4. Setting Menu Screen (2)]

Returning to FIG. 5 and continuing with the setting menu screen G1021. The display area A201 in FIG. 5 is an area for displaying information on two competing teams. For example, the display area A201 displays information of the team as set on the team selection screen G101 shown in FIG. 4.

The display area A202 in FIG. 5 is an area for displaying an image of the stadium currently selected as the game venue. For example, if a stadium ID of the currently selected stadium is "S1", the display area A202 displays an image specified by "S1 .jpg."

The display area A203 in FIG. 5 is an area for displaying the priority of the stadium currently selected as the game venue. In the setting menu screens (e.g., setting menu screens G1021 to G1023), displaying the display area A203 may be omitted. The display area A204 in FIG. 5 is an area for displaying the name of the currently selected stadium. The display areas A203 and A204 are the same as the display areas A213 and A214 in FIG. 6, and thus will not be discussed herein.

Conventionally, as described above, in order to change a stadium selected as a game venue, it is necessary to select the screen element P205 to display the stadium setting screen G103 on the display unit 16, and then change the stadium selected as the game venue on the stadium setting screen G103.

On the other hand, the game device 10 according to this embodiment enables to change the stadium selected as the game venue in a state where the setting menu screen G1021 is displayed, as described below.

The stadium currently selected as the game venue is changed by pressing the predetermined button of the operation unit 15 in a state where the setting menu screen G1021 is displayed. For example, when "R1" button (button 25R) or "L1" button (button 25L) is pressed, the stadium currently selected as the game venue is switched to another one. Here, in a state where the setting menu screen G1021 is displayed, the operation to change the stadium currently selected as the game venue (e.g., operation to press "R1" button or "L1" button) is different from the operation to select an item to change on the setting menu screen G1021 (e.g., operation to move the selection frame P300 to a position that surrounds a desired screen element in the screen elements P201, P203 to P206 using the direction button group 22 or the left stick 24L, and press the button 23B in that state).

For example, when the "R1" button is pressed in a state where the stadium having the priority "i" is selected as the game venue, the stadium selected as the game venue is switched from the stadium having the priority "i" to the stadium having the priority "i+1." Here, if there is no stadium having the priority "i+1" (i.e., "i" is equal to the total number "N" of the selectable stadiums), the stadium selected as the game venue is switched to the stadium having the priority "1."

For example, when the "L1" button is pressed in a state where the stadium having the priority "i" is selected as the game venue, the stadium selected as the game venue is switched from the stadium having the priority "i" to the stadium having the priority "i−1." Here, if there is no stadium having the priority "i−1" (i.e., "i" is equal to "1"), the stadium selected as the game venue is switched to the stadium having the priority "N." In the above example, the "N" is the total number of selectable stadiums. In other words, the "N" is the maximum value of priorities.

When the stadium selected as the game venue is switched to another one, information of the display areas A202 to A204 is updated so as to correspond to the stadium newly selected as the game venue.

Figure 8:
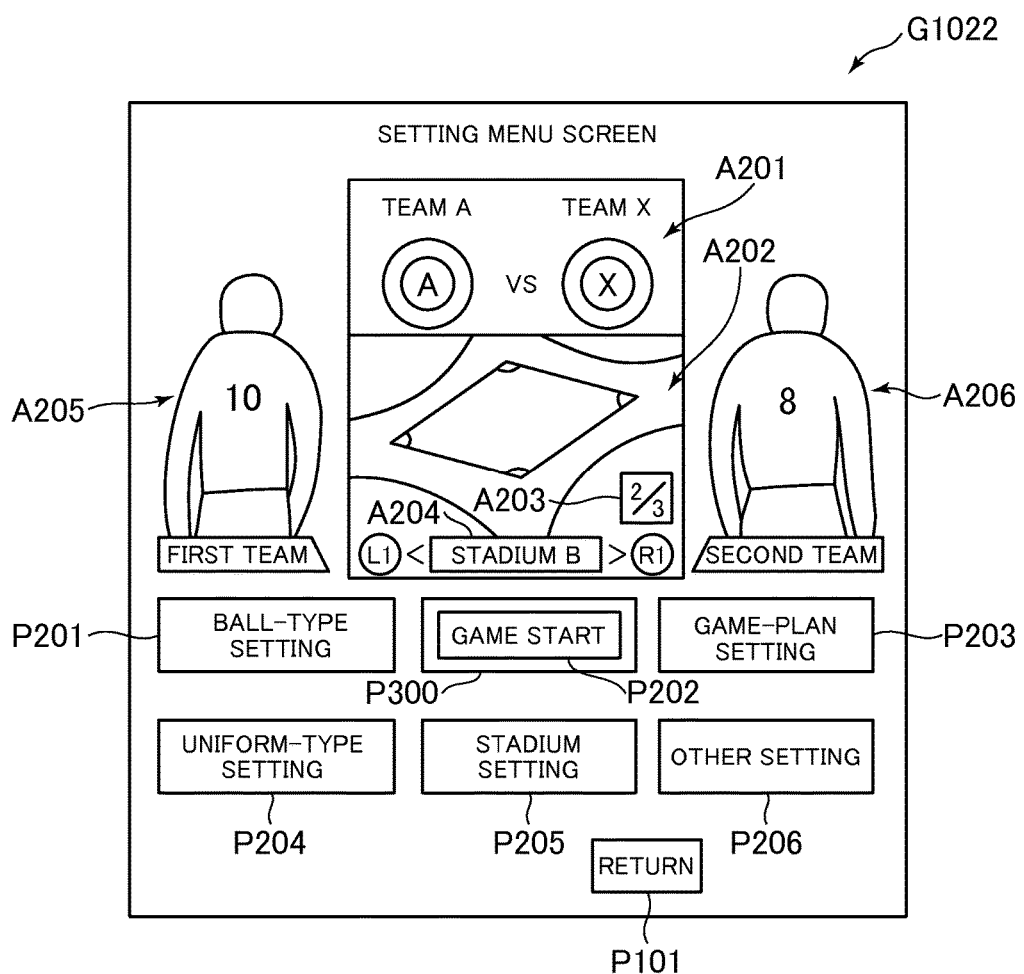
FIG. 8 is a diagram illustrating an example of a setting menu screen.

FIG. 8 shows an example of the setting menu screen G1022 that is updated when the "R1" button is pressed in a state where the setting menu screen G1021 in FIG. 5 is displayed. In the setting menu screen G1021 shown in FIG. 5, the stadium with the stadium ID "S1" is selected as the game venue. As such, when the "R1" button is pressed in a state where the setting menu screen G1021 in FIG. 5 is displayed, the stadium with the stadium ID "S2", which has the next higher priority "2" to the stadium with the stadium ID "S1" having the priority "1", is newly selected as the game venue. Thus, the setting menu screen G1022 in FIG. 8 indicates a state where the stadium with the stadium ID "S2" is selected as the game venue.

For example, in the setting menu screen G1022 shown in FIG. 8, the image displayed in the display area A202 is updated to an image specified by "S2 .jpg" corresponding to the stadium with the stadium ID "S2" selected as the game venue.

The information displayed in the display area A203 in FIG. 8 is updated to "2 (priority of the currently selected stadium)/3 (total number of selectable stadiums)."

The information displayed in the display area A204 in FIG. 8 is updated to text information of "stadium. B", which corresponds to the stadium having the stadium ID "S2" selected as the game venue.

Figure 9:
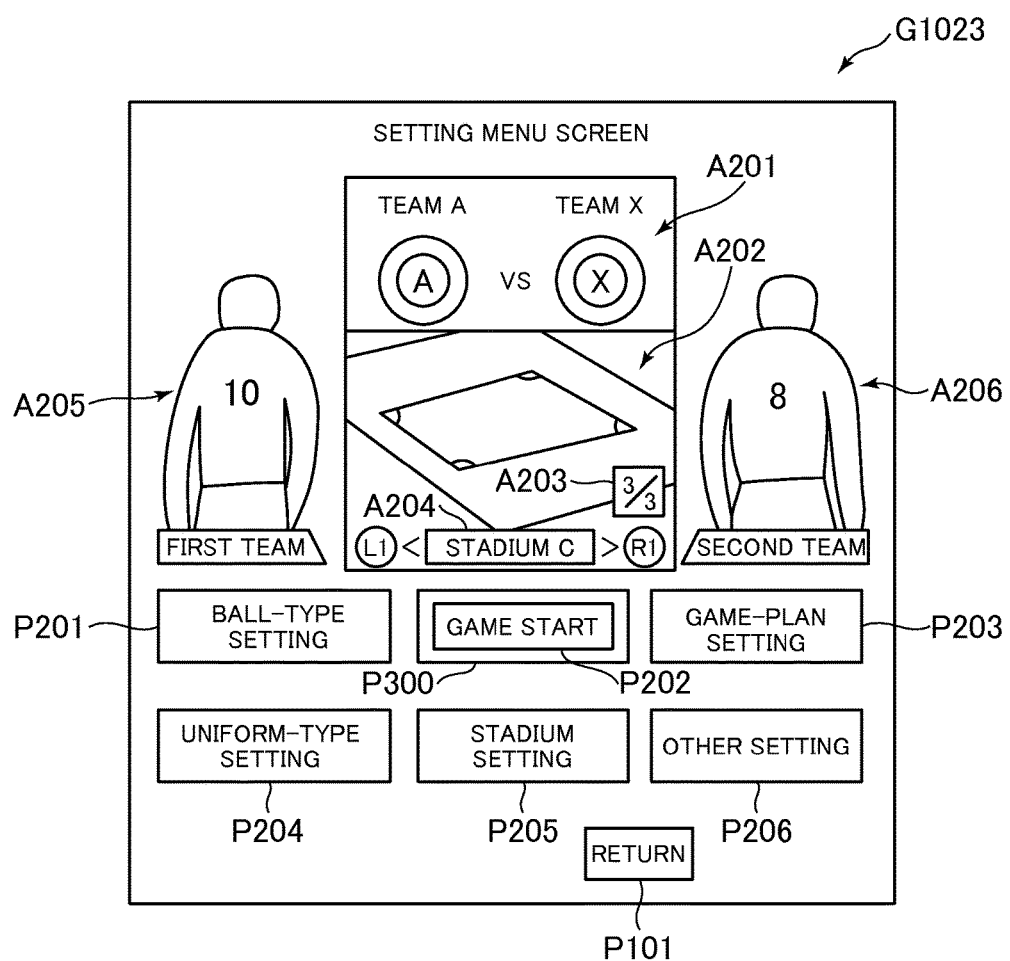
FIG. 9 is a diagram illustrating an example of a setting menu screen.

FIG. 9 shows an example of the setting menu screen G1023 that is updated by pressing the "R1" button in a state where the setting menu screen G1022 in FIG. 8 is displayed. In the setting menu screen G1022 shown in FIG. 8, the stadium with the stadium ID "S2" is selected as the game venue. As such, when the "R1" button is pressed in a state where the setting menu screen G1022 in FIG. 8 is displayed, the stadium with the stadium ID "S3", which has the next higher priority "3" to the stadium with the stadium ID "S2" having the priority "2", is newly selected as the game venue. Thus, the setting menu screen G1023 in FIG. 9 indicates a state where the stadium with the stadium ID "S3" is selected as the game venue.

For example, in the setting menu screen G1023 shown in FIG. 9, the image displayed in the display area A202 is updated to an image specified by "S3.jpg" corresponding to the stadium with the stadium ID "S3" selected as the game venue.

The information displayed in the display area A203 in FIG. 9 is updated to "3 (priority of the currently selected stadium)/3 (total number of selectable stadiums)."

The information displayed in the display area A204 in FIG. 9 is updated to text information of "stadium C", which corresponds to the stadium with the stadium ID "S3" selected as the game venue.

As discussed above, when the "R1" button is pressed in a state where the setting menu screen G1021 FIG. 5 is displayed, the screen shifts to the setting menu screen G1022 in FIG. 8, and when the "L1" button is pressed in a state where the setting menu screen G1021 in FIG. 5 is displayed, the screen shifts to the setting menu screen G1023 in FIG. 9.

When the "R1" button is pressed in a state where the setting menu screen G1022 in FIG. 8 is displayed, the screen shifts to the setting menu screen G1023 in FIG. 9, and when the "L1" button is pressed in a state where the setting menu screen G1022 in FIG. 8 is displayed, the screen shifts to the setting menu screen G1021 in FIG. 5.

When the "R1" button is pressed in a state where the setting menu screen G1023 in FIG. 9 is displayed, the screen shifts to the setting menu screen G1021 in FIG. 5, and when the "L1" button is pressed in a state where the setting menu screen G1023 in FIG. 9 is displayed, the screen shifts to the setting menu screen G1022 in FIG. 8.

The screen element P202 on the setting menu screen G1021 in FIG. 5 is an icon for receiving the start of the game, similarly in FIGS. 8 and 9.

Figure 10:
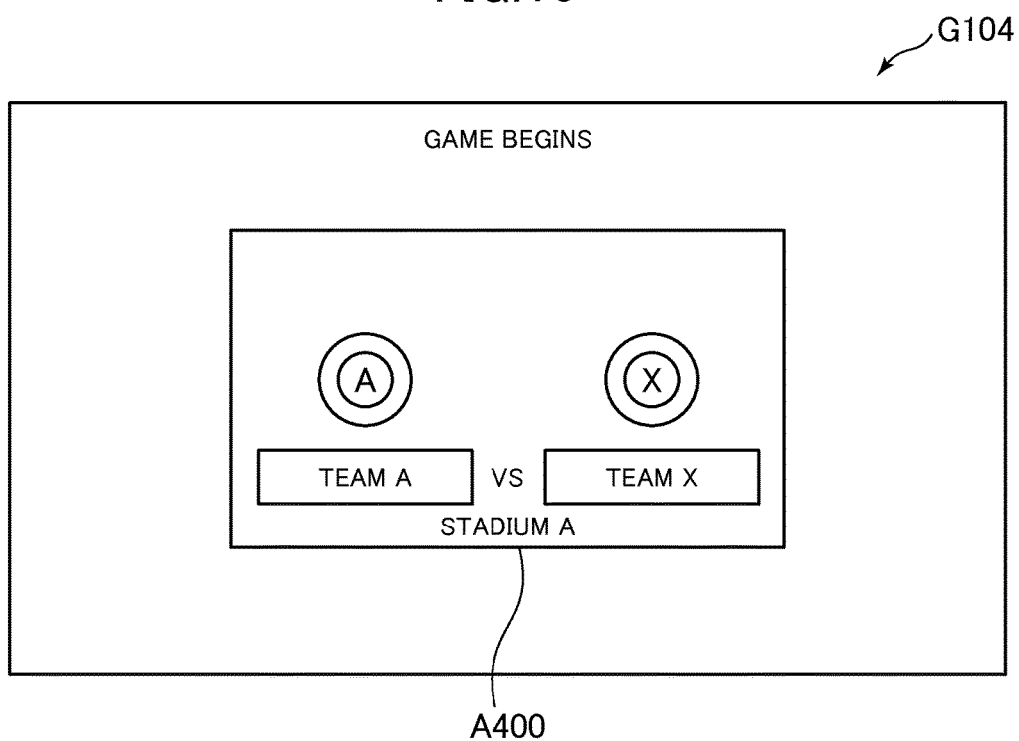
FIG. 10 is a diagram illustrating an example of a game starting screen.

When the screen element P202 on the setting menu screen G1021 in FIG. 5 is selected, a game starting screen G104 shown in FIG. 10 is displayed. The game starting screen G104 shown in FIG. 10 includes a display area A400. The display area A400 displays information on competing teams. An image of the set stadium may be displayed in the game starting screen G104 in FIG. 10.

After the game starting screen G104 shown in FIG. 10 is displayed, the soccer game is executed, and the game screen indicating the soccer game is displayed on the display unit 16. The soccer game is executed based on settings of a team, a type of soccer ball, tactics, a type of uniform, a stadium, and a type of virtual camera, for example.

[3. Functions Implemented In Game Device 10]

Figure 11:
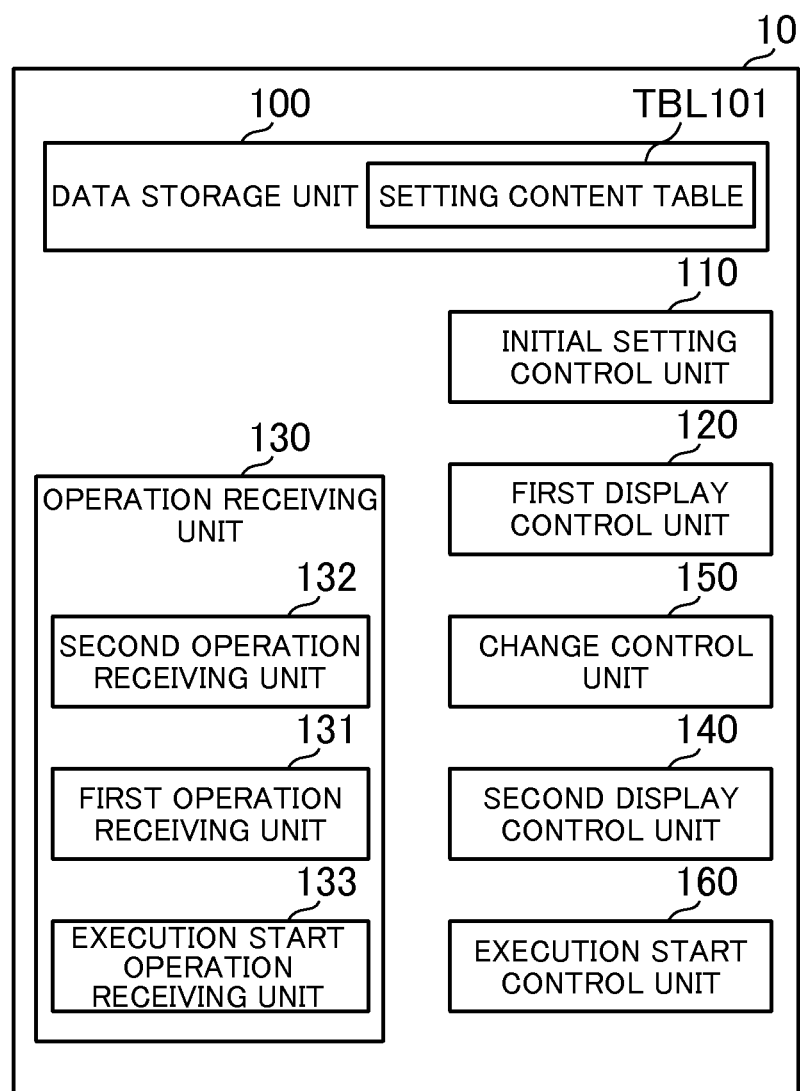
FIG. 11 is a diagram explaining functions of the game device.

The following explains a configuration provided to the game device 10 to implement the above described functions. FIG. 11 is a functional block diagram illustrating functions implemented in the game device 10 and related to the present invention.

As shown in FIG. 11, the game device 10 functionally includes a data storage unit 100, an initial setting control unit 110, a first display control unit 120, an operation receiving unit 130, a second display control unit 140, a change control unit 150, and an execution start control unit 160. In the game device 10, these functions are implemented by the control unit 11 executing processing according to a program stored in the storage unit 12.

[3.1. Data Storage Unit 100]

The data storage unit 100 is mainly implemented by the storage unit 12 or the optical disc drive unit 13 of the game device 10. The data storage unit 100 may be implemented by a storage unit included in other device capable of data communication with the game device 10. The data storage unit 100 stores various data necessary for games executed in the game device 10. In the following, a case is discussed as an example in which a "game" executed in the game device 10 is a soccer game simulating a game between a first team and a second team. In this soccer game, a case is discussed as an example in which the first team is operated by the user, and the second team is controlled by the computer.

[3.1.1. Setting Content Table]

Next, a setting content table TBL101 will be discussed as an example of data stored in the data storage unit 100. The setting content table TBL101 stores settings of items of the game.

The "items" are items (matters) to be set for executing the game. Further, the "items" are freely set by the user. For example, types of the "items" are determined based on content of the game. That is, the "items" to be provided are determined based on the content of the game.

For example, in a case of a soccer game, examples of the "items" include a game venue (stadium), a uniform (uniform worn in the game), a ball (ball used in the game), a formation, starting players, tactics, time zone, season, weather, length of lawn (long or short), and pitch condition (dry or wet).

In the above example, the "items" may be said to be "conditions" for executing the game. For example, the "conditions" are information which the situation of the game is based on or restricted to. For example, in a soccer game, examples of the "conditions" include a game venue (stadium), a uniform (uniform worn in the game), a ball (ball used in the game), a formation, starting players, tactics, time zone, season, weather, length of lawn (long or short), and pitch condition (dry or wet), since generation of a game screen is based on or restricted to such conditions.

FIG. 12 shows an example of the setting content table TBL101. As shown in FIG. 12, the setting content table TBL101 stores settings of items such as "type of ball", "game plan", "type of uniform", "stadium ID", "time zone", "season", "weather", "length of lawn", "pitch condition", and "camera type." In this regard, "stadium ID", "time zone", "season", "weather", "length of lawn", and "pitch condition" are settings relating to the stadium.

When the game is first executed, the content stored in the setting content table TBL101 for each item may be an initial value determined in advance. Regarding the game executed for the second time or later, the content stored in the setting content table TBL101 for each item may be the same as the content set in the previously executed game. In other words, the setting content table TBL101 may store content for each item set for the game executed last time.

[3.2. Initial Setting Control Unit 110]

The initial setting control unit 110 is mainly implemented by the control unit 11 and the storage unit 12 of the game device 10.

The initial setting control unit 110 sets initial content of items of a game based on the content of the items set at the time the game was executed in the past.

In the example of the soccer game shown in FIGS. 4 to 10, the initial setting control unit 110 sets content of items of the soccer game stored in the setting content table TBL101 to initial values of the items. That is, items of the soccer game such as "type of ball", "game plan", "type of uniform", "stadium ID", "time zone", "season", "weather", "length of lawn", "pitch condition", and "type of camera" to be stored in the setting content table TBL101 are set as initial content.

Here, the "initial content" of items is content (settings) of items in the initial state. In other words, "initial content" of an item is content set for the item in advance. Further, in other words, "initial content" of an item is content before being changed by a user.

In the above example, the "past" is a time point before the present. The "past" is a time point before a time point when the initial setting control unit 110 performs settings of initial content of items. Further, the "past" may be a time point when the game was executed before the present.

For example, the initial setting control unit 110 sets initial content of items of a game to respective content of the items of the game at the time when the game was executed in the past.

For example, the initial setting control unit 110 may estimate the user's desired content based on the content when the game was executed in the past, and set initial content of items of the game based on the estimated content.

For example, the initial setting control unit 110 may set, as initial content of each item, content that has been set the highest number of times among the content of items set in the games executed by the user in the past.

Further, for example, the initial setting control unit 110 may set initial content of items of a game based on the content of items set at the time when the game was executed last time.

Here, the "last time" is the most recent time when the game was executed. In other words, the "last time" is the time when the game was executed last before the present time. That is, in a case where the game device 10 executes the game multiple times, the content of items of the last executed game is "the content of items set at the time when the game was executed last time."

For example, the initial setting control unit 110 may set initial content of items of a game to the content of items set at the time the game was executed last time.

For example, the initial setting control unit 110 may estimate the user's desired content based on the content when the game was executed last time, and set initial content of items of the game based on the estimated content. For example, the initial setting control unit 110 may set initial content of each item by replacing the content set for a part of the items at the time when the game was executed last time with the content predetermined for a combination of content set for the other items.

For example, content to be recommended to a user may be determined based on the content of the game executed in the past, and set initial content to the determined content. For example, the initial setting control unit 110 may prepare some recommended combinations of initial content to be set for items of the game, and set the initial content based on a combination most similar to the user's representative settings among the recommended combinations. The user's representative settings may be a combination of content that is set the highest number of times among the content set for items in the games executed by the user in the past.

For example, content to be recommended to the user may be determined based on the content at the time the game was executed last time, and initial content may be set to the determined content. For example, the initial setting control unit 110 may prepare some recommended combinations of initial content to be set for items of the game, and set the initial content based on a combination most similar to the content at the time the game was executed last time among the recommended combinations.

The initial setting control unit 110 itself may set initial content of items of the game. Alternatively, the initial setting control unit 110 may request other devices to set initial content of items of the game.

In a case where the game has not been executed previously, the initial setting control unit 110 may set the initial content of the items to the predetermined content. Here, the optical disc drive unit 13 may read the "predetermined content" from the optical disc that stores data of the game.

[3.3. First Display Control Unit 120]

The first display control unit 120 is mainly implemented by the control unit 11 and the storage unit 12 of the game device 10.

The first display control unit 120 displays an item selecting screen, which receives selection of at least one of the items relating to the game, on the display unit 16. Here, the item selecting screen includes areas that display information on content of the specified items among from the items.

In the example of the soccer game shown in FIGS. 4 to 10, the setting menu screens G1021 to G1023 shown in FIGS. 5, 8, and 9 correspond to examples of the "item selecting screens." In this case, "type of ball", "game plan", "type of uniform", and "stadium" correspond to examples of the "items." The "stadium" corresponds to an example of the "specified item." Further, the display areas A202, A203, and A204 in FIGS. 5, 8, and 9 correspond to examples of "areas that display information on content of the specified items."

The "item selecting screen" is a screen that displays a plurality of items, for example, and enables a user to select at least one of the items.

The "item selecting screen" may be, for example, a screen that displays options associated with one or more items and enables a user to select one of the options. In this case, images indicating items, such as buttons or icons, may be displayed as the "options." Alternatively, texts indicating items may be displayed as the "options."

For example, a menu screen that displays buttons (or icons) respectively corresponding to setting screens to be used for various settings corresponds to the "item selecting screen." In this case, when the user selects one of the buttons (or icons) displayed on the menu screen, one of the setting screens is selected.

For example, an example of the "item selecting screen" corresponds to a menu screen that displays some texts indicating setting screens to be used for various settings, and further displays types of buttons provided to the game controller 15 or the game device 10 connected to the game device 10 in association with corresponding texts. In this menu screen, when the user presses one of the buttons provided to the game controller 15 or the game device 10, one of the setting screens is selected. In other words, a menu screen configured to shift to each of setting screens corresponds to an example of the "item selecting screen."

The "specified item" is an item that is selected by, for example, game developers, game service providers, or users, from a plurality of items. For example, an item that is frequently changed in content may be set as the "specified item." For example, an item that has high possibility to be changed in content may be set as the "specified item." Further, for example, when it is assumed that a lot of users want to change content of a certain item, such item may be set as the "specified item."

In the above example, "content of item" is content set regarding an item. In other words, "content of item" is settings of an item. For example, when an item is "stadium", a stadium set as a game venue corresponds to the "content of item." For example, when an item is "type of ball", a type of soccer ball set as a soccer ball to be used in a game corresponds to "content of item."

In the above example, "information on content of an item" is, for example, "information for identifying content of an item." For example, when an item is "stadium", identification information of the stadium set as a game venue corresponds to "information on content of an item." For example, when an item is "type of ball", identification information of the type of soccer ball set as a soccer ball to be used in a game corresponds to "information on content of an item."

In the above example, "information on content of an item" may be, for example, an image indicating content of an item (i.e., settings of an item). For example, the "information on content of an item" may be a text indicating content of the item. For example, the "information on content of an item" may be a combination of an image and a text indicating content of the item. For example, when an item is "stadium", an image of the stadium set as a game venue corresponds to an example of "information on content of an item." In addition, a name (text) of the stadium set as a game venue also corresponds to an example of "information on content of an item."

For example, the first display control unit 120 generates an item selecting screen, and displays the generated item selecting screen on the display unit 16. Alternatively, for example, the first display control unit 120 may send data necessary for displaying the item selecting screen to other devices. In other words, the first display control unit 120 may send data necessary for displaying the item selecting screen to other devices, thereby causing the other devices to display the item selecting screen on the display device based on the sent data.

The "data necessary for displaying the item selecting screen" may be data necessary for generating an item selecting screen, or data indicating the generated item selecting screen. Alternatively, the "data necessary for displaying the item selecting screen" may be image data. In other words, the first display control unit 120 may generate "image" that enables a user who sees displayed content to select an item, and display the generated "image" on the display unit 16.

[3.4. Operation Receiving Unit 130]

The operation receiving unit 130 is mainly implemented by the control unit 11, the storage unit 12, the operation unit 15, and the display unit 16 of the game device 10.

The operation receiving unit 130 receives an operation performed by a user using the operation unit 15. For example, the operation receiving unit 130 receives an operation performed by the user using the operation unit 15 in a state where the screen is displayed on the display unit 16.

Further, the operation receiving unit 130 includes a first operation receiving unit 131, a second operation receiving unit 132, and an execution start operation receiving unit 133.

[3.5. First Operation Receiving Unit 131]

For example, in a case where an item selecting screen, which receives selection of at least one of items, is displayed, the first operation receiving unit 131 receives a first operation to select at least one of the items.

In an example of a soccer game shown in FIGS. 4 to 10, an example of "first operation" corresponds to an operation to press a predetermined button (e.g., button 23B) of the game controller 15 in a state where one of the screen elements P201 and P203 to P206 is surrounded by the selection frame P300 on the setting menu screen G1021. That is, in the example of the soccer game shown in FIGS. 4 to 10, when the setting menu screen G1021 is displayed, the first operation receiving unit 131 receives an operation to press a predetermined button (e.g., button 23B) of the game controller 15 as the "first operation" in a state where one of the screen elements P201 and P203 to P206 is surrounded by the selection frame P300.

The "first operation" is an operation performed by a user. For example, in a case where the "item selecting screen" is a screen on which a plurality of items are displayed, an operation to select at least one of the items displayed on the item selecting screen corresponds to the "first operation." Further, for example, in a case where at least one of the items displayed on the item selecting screen is selected by multiple operations, these multiple operations correspond to the "first operation." Specifically, for example, in a case where at least one of the items is set to a selected state and then the item set to the selected state at that point is determined as the "selected item" by performing an operation to confirm the state, a combination of "operation to set the selected state" and "confirming operation" corresponds to the "first operation."

For example, in a case where the "item selecting screen" is a screen displaying options associated with one or more items, an operation to select at least one of the options displayed on the item selecting screen corresponds to the "first operation." Further, for example, in a case where at least one of the options displayed on the item selecting screen is selected by multiple operations, these multiple operations correspond to the "first operation." Specifically, for example, in a case where at least one of the options is set to a selected state and then the item associated with the option set to the selected state at that point is determined as the "selected item" by performing an operation to confirm the state, a combination of "operation to set the selected state" and "confirming operation" corresponds to the "first operation."

For example, the "first operation" is an operation performed with use of the operation unit 15 that a user can hold. For example, in a case where the "item selecting screen" is a screen that displays screen elements (e.g., icons) respectively corresponding to setting screens and an operation is performed with use of the game controller 15, the "first operation" corresponds to an operation to set one of the screen elements to a selected state using the direction button group 22 or the left stick 24L and determine the icon set to the selected state as the "selected icon" by pressing a predetermined button of the game controller 15.

For example, in a case where the "item selecting screen" is a screen that displays screen elements (e.g., icons) respectively corresponding to setting screens and an operation is performed with use of a touch panel, the "first operation" corresponds to an operation to indicate one of the screen elements using the touch panel in order to select the screen element.

Upon receiving the first operation, the first operation receiving unit 131 outputs information indicating the first operation to the second display control unit 140.

[3.6. Second Display Control Unit 140]

The second display control unit 140 is mainly implemented by the control unit 11 and the storage unit 12 of the game device 10.

When the item selecting screen is displayed, the second display control unit 140 displays a setting screen, which receives a change of content of an item selected from the items, on the display unit 16 in response to the first operation received from the first operation receiving unit 131.

For example, in an example of a game shown in FIGS. 4 to 10, an example of "setting screen" corresponds to each of a ball type setting screen, a game plan setting screen, a uniform type setting screen, a stadium setting screen G103 (FIG. 6), and another setting screen. That is, when an item selected from the items is "stadium", the stadium setting screen G103 shown in FIG. 6 corresponds to an example of the "setting screen."

The "setting screen" is a screen on which current content of the item selected by the first operation performed by the user is displayed, for example. Further, the "setting screen" is a screen on which content of the displayed item is changed in response to the first operation. The change of the content of the item may be determined at the time when the content displayed on the setting screen is changed, or when the confirming operation is performed or the setting screen disappears (i.e., when the setting screen shifts to another screen such as an item selecting screen). In a case where the content of the item is changed on the setting screen, the content of the changed item is read into the setting content table TBL101.

For example, the second display control unit 140 generates a setting screen, and displays the generated setting screen on the display unit 16. For example, the second display control unit 140 may send data necessary for displaying a setting screen to other devices. In other words, the second display control unit 140 may send data necessary for displaying the setting screen to other devices, thereby causing the other devices to display the setting screen on the display device based on the sent data.

The "data necessary for displaying a setting screen" may be data necessary for generating a setting screen, or data indicating the generated setting screen. The "data necessary for displaying a setting screen" may be image data. In other words, the second display control unit 140 may generate "image" that enables a user who sees displayed content to change the content of an item, and display the generated "image" on the display unit 16.

[3.7. Second Operation Receiving Unit 132]

When the item selecting screen is displayed, the second operation receiving unit 132 receives a second operation to change content a specified item in the items.

For example, in an example of a game shown in FIGS. 4 to 10, an example of "second operation" corresponds to an operation to press a "R1" button or a "L1" button in a state where the setting menu screens G1021 to G1023 shown in FIGS. 5, 8, and 9 are displayed on the display unit 16. That is, the second operation receiving unit 132 receives the operation to press the "R1" button or the "L1" button as the "second operation" in a state where the setting menu screens G1021 to G1023 shown in FIGS. 5, 8, and 9 are displayed on the display unit 16.

The "second operation" is an operation performed by a user to change content of the specified item from current content to other content. Further, the "second operation" is an operation different from a first operation.

For example, the "second operation" is an operation performed with use of the operation unit 15 (game controller 15) that a user can hold. For example, the "second operation" is an operation performed with use of an operation part different from the operation part used in the first operation. For example, the "second operation" is performed using the operation part provided to a surface on the back of the operation unit 15 (game controller 15) viewed from a user holding the operation unit 15 (game controller 15). The "surface on the back of the operation unit 15 viewed from a user" is a surface depicted as a rear view when the operation unit placed in a direction usually held by the user is depicted in six views. The "surface on the back of the operation unit 15 viewed from a user" is a surface touched by index fingers or middle fingers when the user holds the operation unit. For example, in a case of the game controller 15 shown in FIG. 3, the back side surface 27 corresponds to "surface on the back of the operation unit 15 viewed from a user".

For example, the "second operation" may be an operation performed using a touch panel. In a case where an operation is performed using the touch panel, for example, the "second operation" corresponds to an operation to slide a finger on the touch panel in a predetermined direction (e.g., left to right or up and down) different from the direction of the first operation so as to change the content of item. Specifically, for example, the "second operation" corresponds to an operation to slide a finger on an area (e.g., display area A202), on which information on content of the specified item is displayed, in a predetermined direction (e.g., left to right) so as to change the content of item.

Upon receiving the second operation, the second operation receiving unit 132 outputs information indicating the second operation to the change control unit 150.

[3.8. Change Control Unit 150]

The change control unit 150 is mainly implemented by the control unit 11 and the storage unit 12 of the game device 10.

The change control unit 150 changes the content of the specified item in response to the second operation, which is different from the first operation, in a state where the item selecting screen is displayed on the display unit 16. For example, the change control unit 150 changes the content of the specified item when the second operation receiving unit 132 receives the second operation in a state where the item selecting screen is displayed on the display unit 16.

For example, in response to the second operation, the change control unit 150 changes at least a part of information on the content of the specified item stored in the storage unit 12 (data storage unit 100).

For example, in an example of a game shown FIGS. 4 to 10, the specified item corresponds to "stadium", and thus the change control unit 150 changes the stadium selected as the game venue in response to the second operation. That is, the change control unit 150 changes the stadium ID stored in the setting content table TBL101 in response to the second operation.

For example, in response to the second operation, the change control unit 150 switches the stadium selected as the game venue to one of the predetermined stadiums according to a predetermined order. In this regard, the stadium corresponds to an example of content of the specified item.

The "predetermined order" is an order determined based on a priority or a display order determined for each of the stadiums that can be set as a game venue (i.e., stadium to be used in a game). For example, in a case where a priority or a display order is set for each of the stadiums, an order of ascending priority or display order (i.e., an order from higher priority or display order to lower priority or display order) corresponds to an example of "predetermined order." Alternatively, for example, an order of descending priority or display order (i.e., an order from lower priority or display order to higher priority or display order) corresponds to an example of "predetermined order."

"Switch the stadium according to a predetermined order" is to change the stadium set as the game venue (i.e., stadium to be used in a game) to a stadium previous or subsequent to the current stadium. Here, the "stadium previous to the current stadium" is a stadium immediately previous to the current stadium. The "stadium subsequent to the current stadium" is a stadium immediately subsequent to the current stadium.

For example, in a case where the "predetermined order" is an order of ascending priority or display order and a stadium having the ith priority or display order is set as the game venue (i.e., stadium to be used in a game), to change the game venue to a stadium having the i+1th priority or display order corresponds to "switch the stadium according to a predetermined order."

For example, in a case where the "predetermined order" is an order of descending priority or display order and a stadium having the ith priority or display order is set as the game venue (i.e., stadium to be used in a game), to change the game venue to a stadium having the i−1th priority or display order corresponds to "switch the stadium according to a predetermined order."

For example, in a state where the last stadium of the stadiums is set as the game venue (i.e., stadium to be used in a game), the change control unit 150 may change the game venue to the first stadium of the stadiums in response to the second operation.

For example, in a case where the "predetermined order" is an order of ascending priority or display order, the "first stadium" is a stadium for which the highest priority or display order is set. For example, the stadium having the first priority or display order corresponds to the "first stadium." In this case, the "last stadium" is a stadium for which the lowest priority or display order is set. For example, in a case where the number of stadiums is N (N: natural number of 2 or more), the stadium having the Nth priority or display order corresponds to the "last stadium."

For example, in a case where the "predetermined order" is an order of descending priority or display order, the "first stadium" is a stadium for which the lowest priority or display order is set. For example, in a case where the number of stadiums is N (N: natural number of 2 or more), the stadium having the Nth priority or display order corresponds to the "first stadium." In this case, the "last stadium" is a stadium for which the highest priority or display order is set. For example, a stadium having the first priority or display order corresponds to the "last stadium."

The change control unit 150 itself may not change at least a part of information on content of the specified item stored in the storage unit, but request other devices to change at least a part of information on content of the specified item stored in the storage unit.

[3.9. Execution Start Operation Receiving Unit 133]

The "item selecting screen" is a screen that is displayed before execution of a game is started, and receives an instruction to start the game. The execution start operation receiving unit 133 receives an operation to instruct to start execution of a game (hereinafter "execution start operation") in a state where the item selecting screen is displayed on the display unit 16.

For example, in an example of a game shown in FIGS. 4 to 10, the setting menu screens G1021 to G1023 shown in FIGS. 5, 8, and 9 correspond to the "item selecting screen" and the "screen that receives an instruction to start the game", and an operation to select the screen element P202 in a state where the setting menu screens G1021 to G1023 are displayed on the display unit 16 correspond to an example of "execution of start operation." That is, in an example of a game shown in FIGS. 4 to 10, the execution start operation receiving unit 133 receives, as "execution start operation", the operation to select the screen element P202 in a state where the setting menu screens G1021 to G1023 shown in FIGS. 5, 8, and 9 are displayed on the display unit 16.

The "execution start operation" is an operation performed by a user. For example, the "execution start operation" is an operation performed with use of the operation unit 15 (game controller 15) that a user can hold.

The "screen that receives an instruction to start the game" is a screen, for example, on which screen elements (e.g., image such as icon or button) indicating the start of the game execution are displayed. Regarding such a screen, it is determined that start of the game is instructed when such screen element is selected. In this case, an operation to select the screen element corresponds to an example of the "execution start operation." For example, in a case where the operation is performed using the game controller 15, an operation to press a predetermined button (e.g., button 23B) of the game controller 15 in a state where the screen element is selected corresponds to an example of the "execution start operation." Further, for example, in a case where the operation is performed using a touch panel, an operation to indicate the screen element via the touch panel corresponds to an example of the "execution start operation."

For example, "screen that receives an instruction to start the game" is a screen on which a text to indicate start of the game is displayed. Regarding such a screen, it is determined that start of the game is instructed when a text indicating the start of the game is instructed. In this case, an operation to instruct the text indicating the start of the game corresponds to an example of the "execution start operation."

For example, "screen that receives an instruction to start the game" is a screen displaying that a predetermined operation needs to be performed in order to start a game. Regarding such a screen, it is determined that start of the game is instructed when the predetermined operation is performed. In this case, the predetermined operation corresponds to an example of the "operation to instruct to start execution of a game." Specifically, for example, a screen displaying a text of "press a button to start a game" corresponds to an example of the "screen that receives an instruction to start the game." Regarding such a screen, it is determined that start of the game is instructed when the button is pressed. In this case, an operation to press the button corresponds to an example of the "operation to instruct to start execution of a game."

Here, "execution of a game" is to execute a game based on, for example, settings of a plurality of items.

For example, in a case where a game uses a virtual three-dimensional space, constructing and updating the virtual three-dimensional space corresponds to an example of the "execution of a game." In this case, content of the constructed virtual three-dimensional space is changed according to the content set for the items. For example, in a soccer game, an example of the "execution of a game" corresponds to constructing a virtual three-dimensional space including a pitch, players, and a ball based on settings of items such as a stadium, a type of ball, and a uniform, and updating the virtual three-dimensional space based on an operation received from a user.

For example, in a case where the game is a sport game, executing the sport game corresponds to an example of the "execution of a game." For example, in a case where the game is a match game in which a user competes with an opponent (a user or a computer), executing the match corresponds to an example of the "execution of a game."

In the above example, "start execution of a game" is, for example, to start the "execution of a game." For example, "start execution of a game" is to start processing by the control unit based on the program for controlling the "execution of a game." For example, "start execution of a game" is to start a game play by a user. For example, in a case where the game is a sport game, "start execution of a game" is to start a sport game.

In the above example, "before execution of a game is started" is, for example, before the time point when the "execution of a game" is started. Further, "before execution of a game is started" is, for example, a time point before the time point when the "instruction to start the game" is received. For example, a period before the time point when the content of items set for the game are determined is "before execution of the game is started." For example, in a case of a sport game, "before execution of a game is started" may correspond to "before the sport game is started", "before a scene of players of the game entering the stadium is displayed", and "before the players are introduced." For example, in a case of a soccer game, "before execution of a game is started" may correspond to before a kickoff, before play ball is called in a case of a baseball game, and before a face-off in a case of an ice hockey game. For example, in a case of a battle game, "before execution of a game is started" may correspond to "before the competing characters are placed at the predetermined positions" and "before a siren (gong) makes a sound of starting a battle." For example, in an action game, "before execution of a game is started" may correspond to "before the actions of the characters can be controlled by the user's operation", and "before counting of playing time is started" and "before subtracting the remaining time to the time limit is started."

Upon receiving the execution start operation, the execution start operation receiving unit 133 outputs information indicating the execution start operation to the execution start control unit 160.

[3.10. Execution Start Control Unit 160]

The execution start control unit 160 is mainly implemented by the control unit 11 and the storage unit 12 of the game device 10.

In a state where the item selecting screen is displayed, the execution start control unit 160 executes controlling of start of a game in response to a start operation of the game (i.e., operation to instruct start of the game) based on the content of the items.

Here, "controlling of start of a game" is, for example, to start execution of a game. Further, to execute processing for starting execution of a game also corresponds to "controlling of start of a game." For example, in a case of a soccer game, to start the soccer game corresponds to an example of "controlling of start of a game." For example, in a case of a soccer game, displaying the game starting screen G104 shown in FIG. 10 on the display unit 16 also corresponds to an example of "controlling of start of a game."

Further, "controlling of start of a game" may be, for example, requesting other devices to start execution of a game. In this regard, requesting other devices to execute processing for starting a game also corresponds to an example of "controlling of start of a game."

[4. Processing Executed In Game Device 10]

Figure 13:
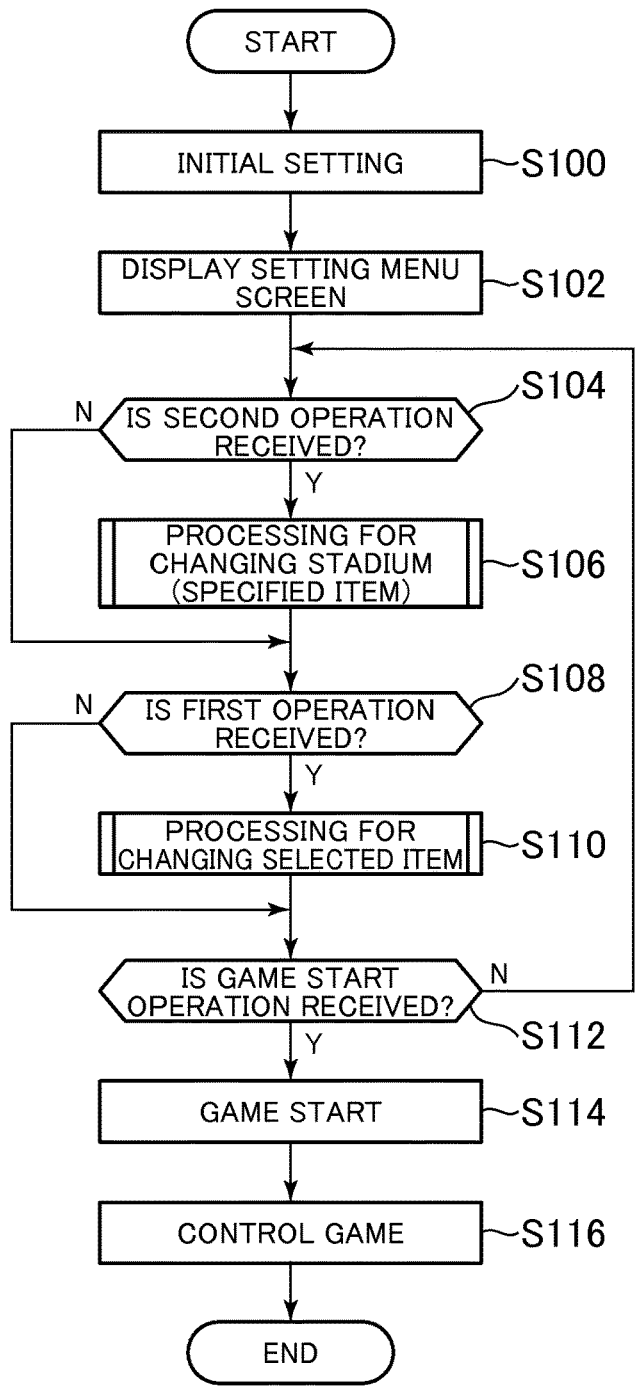
FIG. 13 is a flow chart illustrating processing for controlling game settings.
Figure 14:
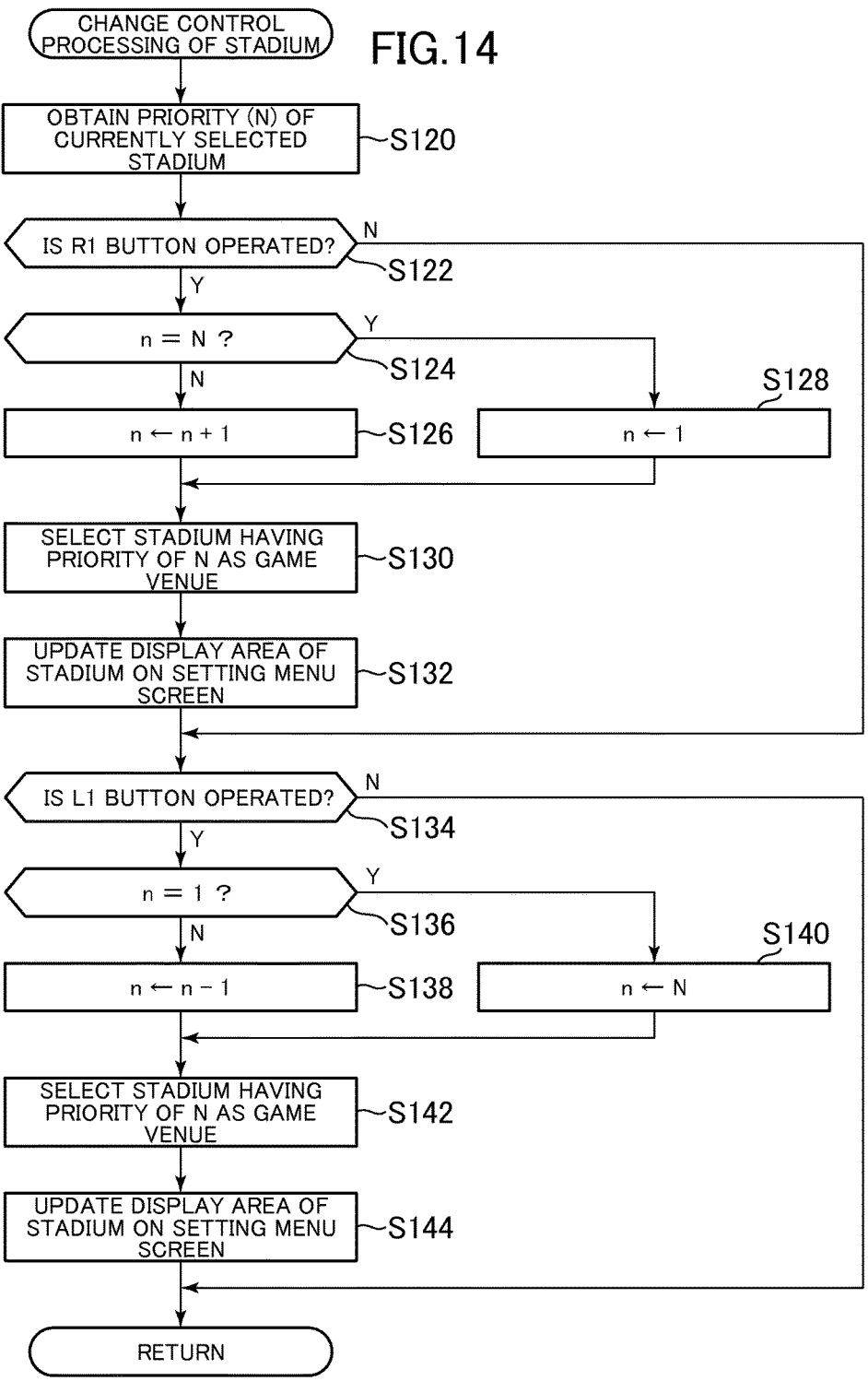
FIG. 14 is a flow chart illustrating change control processing of a stadium.
Figure 15:
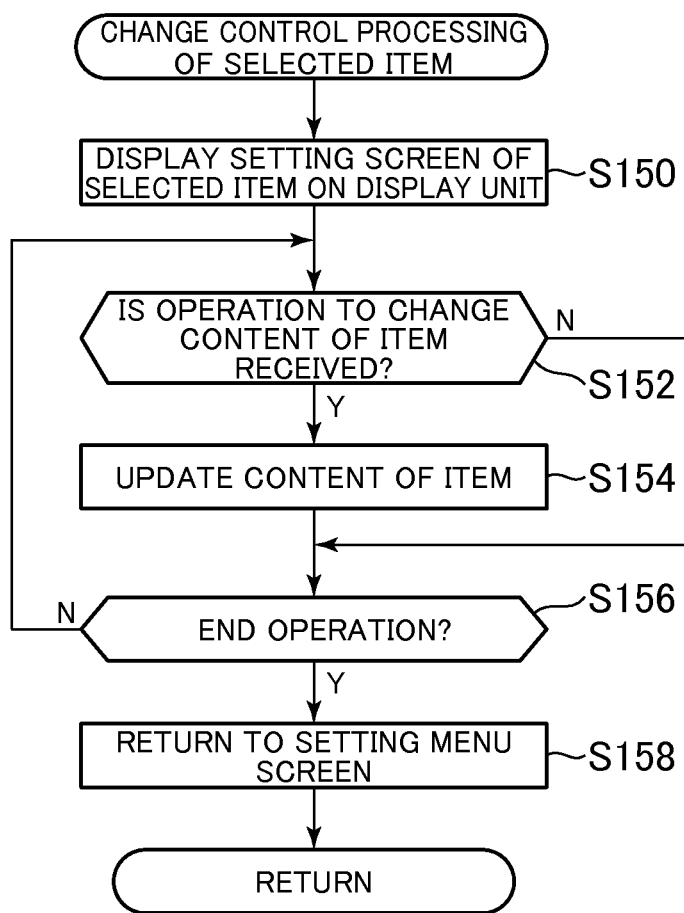
FIG. 15 is a flow chart illustrating change control processing of a selected item.

Next, an example of processing executed in the game device 10 will be discussed. FIGS. 13 to 15 illustrate the processing executed in the game device 10. The processing shown in FIGS. 13 to 15 is executed by the control unit 11 of the game device 10 based on a program stored in the storage unit 12 or a program read from an optical disc by the optical disc drive unit 13. In the following, an example of processing for controlling settings of a soccer game performed before the game starts will be discussed.

[4.1. Processing for Controlling Settings of a Game]

FIG. 13 is a flow chart showing the processing for controlling settings of a game. As shown in FIG. 13, the control unit 11 of the game device 10 executes processing for setting initial content of items based on content of the items at the time when the game was previously executed (S100). For example, the control unit 11 of the game device 10 refers to the setting content table TBL101 that stores the content of settings of the previous game in order to set the initial content of the items.

Next, the control unit 11 of the game device 10 displays a setting menu screen on the display unit 16 based on the initial content of the items (S102). The setting menu screen corresponds to an example of the item selecting screen. For example, the setting menu screen G1021 shown in FIG. 5 corresponds to an example of the setting menu screen displayed in S102. In this case, the display areas A202 to A204 display information on the stadium currently selected as the game venue. In other words, information on the stadium selected at the time when the game (soccer game) was previously executed is displayed.

Subsequently, the control unit 11 of the game device 10 determines whether a second operation is received based on an operation signal supplied from the operation unit 15 (S104). For example, the "second operation" is an operation to press a "R1" button or a "L1" button.

When the second operation is received (S104:Y), the control unit 11 of the game device 10 executes processing for changing settings of the stadium, which is the specified item among the plurality of items (processing for changing the stadium) (S106). The processing for changing the stadium will be discussed in detail later based on a flow chart shown in FIG. 14.

After the processing for changing the stadium (S106) is executed, or when the second operation is not received (S104:N), the control unit 11 of the game device 10 proceeds to processing of S108.

The control unit 11 of the game device 10 determines whether a first operation is received based on an operation signal supplied from the operation unit 15 (S108). For example, the "first operation" is an operation to select one of the plurality of items. For example, the "first operation" is an operation to press a predetermined button (e.g., button 23B) of the game controller 15 in a state where one of the screen elements P201 and P203 to P206 is surrounded by the selection frame P300 on the setting menu screen G1021. In this case, the item corresponding to the screen element surrounded by the selection frame P300 is a selected item.

When the first operation is received (S108:Y), the control unit 11 of the game device 10 executes processing for changing settings of the selected item among the plurality of items (processing for changing the selected item) (S110). The processing for changing the selected item will be discussed in detail later based on a flow chart shown in FIG. 15.

After the processing for changing the selected item (S110) is executed, or when the first operation is not received (S108:N), the control unit 11 of the game device 10 proceeds to processing of S112.

The control unit 11 of the game device 10 determines whether the game start operation (execution start operation) is received based on the operation signal supplied from the operation unit 15 (S112). For example, the "game start operation" is an operation to press a predetermined button (e.g., button 23B) of the game controller 15 on the setting menu screen G1021 in a state where the screen element P202 is surrounded by the selection frame P300.

If the game start operation is not received (S112:N), the control unit 11 of the game device 10 returns to S104. If the game start operation is received (S112:Y), the control unit 11 of the game device 10 executes processing for starting a soccer game based on the settings of the items (S114). Further, the control unit 11 of the game device 10 controls the soccer game based on the operation signal supplied from the operation unit 15 (S116), and, when a predetermined end condition is satisfied, ends the game to finish the processing.

[4.2. Change Control Processing of Stadium (Specified Item)]

Next, change control processing of the stadium will be discussed based on the flow chart shown in FIG. 14.

As shown in FIG. 14, the control unit 11 of the game device 10 obtains a priority (n) of the stadium currently selected as the game venue (S120). For example, the control unit 11 of the game device 10 obtains the priority (n) associated with a stadium ID for identifying the stadium currently selected as the game venue.

Subsequently, the control unit 11 of the game device 10 determines whether the operation to press the "R1" button is received in S104 (S122). If the operation to press the "R1" button is received in S104 (S122:Y), the control unit 11 of the game device 10 executes the processing of S124.

That is, the control unit 11 of the game device 10 determines whether n is equal to N (S124). Here, "N" indicates the number of stadiums that the user can select. In other words, "N" indicates the maximum value of the priority of the stadium. If n is not equal to N (S124:N), the control unit 11 of the game device 10 adds 1 to n and updates n (S126). On the other hand, if n is equal to N (S124:Y), the control unit 11 of the game device 10 substitutes 1 for n and updates n (S128).

The control unit 11 of the game device 10 then selects the stadium having the priority of "n" as a game venue based on n updated in S126 and S128 (S130). That is, the stadium currently selected as the game venue is updated to the stadium having the priority of "n." In this case, the control unit 11 of the game device 10 writes identification information of the stadium newly selected as the game venue in the setting content table TBL101.

The control unit 11 of the game device 10 updates display content of the display areas A202 to A204 on the setting menu screen G1021, on which information of stadium is displayed, to information of the stadium having the priority of "n" (S132).

After the processing of S132 is executed, or if the operation to press the "R1" button is not received in S104 (S122:N), the control unit 11 of the game device 10 proceeds to the processing of S134.

That is, the control unit 11 of the game device 10 determines whether the operation to press the "L1" button is received in S104 (S134). If the operation to press the "L1" button is received in S104 (S134:Y), the control unit 11 of the game device 10 executes the processing of S136.

That is, the control unit 11 of the game device 10 determines whether n is equal to 1 (S136). If n is not equal to 1 (S136:N), the control unit 11 of the game device 10 subtracts 1 from n and updates n (S138). On the other hand, if n is equal to 1 (S136:Y), the control unit 11 of the game device 10 substitutes N for n and updates n (S140). As discussed above, "N" indicates the number of stadiums that the user can select. In other words, "N" indicates the maximum value of the priority of the stadium.

The control unit 11 of the game device 10 then selects the stadium having the nth priority as a game venue based on n updated in S138 or S140 (S142). That is, the stadium currently selected as the game venue is updated to the stadium having the priority of "n." In this case, the control unit 11 of the game device 10 writes identification information of the stadium newly selected as the game venue in the setting content table TBL101.

The control unit 11 of the game device 10 updates display content of the display areas A202 to A204 on the setting menu screen G1021, on which information of the stadium is displayed, to information of the stadium having the priority of "n" (S144).

After the processing of S144 is executed, or if the operation to press the "L1" button is not received in S104 (S134:N), the control unit 11 of the game device 10 ends the change control processing of the stadium.

[4.3. Change Control Processing of Selected Item]

Next, the change control processing of the selected item will be discussed based on the flow chart shown in FIG. 15.

As shown in FIG. 15, the control unit 11 of the game device 10 displays, on the display unit 16, a setting screen of the item selected by the first operation received in S108 (S150). For example, in a case where the selected item is a stadium, the control unit 11 of the game device 10 displays the stadium setting screen G103 on the display unit 16.

Next, the control unit 11 of the game device 10 determines whether an operation to change content of the selected item is received based on the operation signal supplied from the operation unit 15 (S152). If the operation to change content of the selected is received (S152:Y), the control unit 11 of the game device 10 updates content of the selected item based on the received operation (S154). In this case, the control unit 11 of the game device 10 writes the content of the updated selected item in the setting content table TBL101.

After the processing of S154 is executed, or if an operation to change the content of the selected item is not received (S152:N), the control unit 11 of the game device 10 determines whether an operation to end the setting of the selected item is received based on the operation signal supplied from the operation unit 15 (S156).

If the operation to end the setting of the selected item is not received (S156:N), the control unit 11 of the game device 10 returns to the processing of S152. On the other hand, if the operation to end the setting of the selected item is received (S156:Y), the control unit 11 of the game device 10 controls the display to return to the setting menu screen G1021 from the setting screen of the selected item (S158), and ends the change control processing of the selected item.

The above explains an example of the processing for controlling settings of the game executed by the game device 10.

According to the game device 10 described above, in principle, content of an item needs to be changed on a setting screen, which is displayed by selecting the item on the item selecting screen. However, content of the specified item can be changed on the item selecting screen without displaying a setting screen. In this way, it is possible to reduce the number of operations that the user needs to do in order to change content of the specified item.

Further, according to the game device 10, content of the specified item can be changed on the item selecting screen without displaying a setting screen, and an instruction to start execution of a game can also be made on the item selecting screen, and thus it is possible to reduce the number of operations that the user needs to do in order to change content of the specified item and start execution of a game. That is, the user can quickly change content of the specified item and start execution of a game.

Further, according to the game device 10, for example, it is possible to set initial content of items similarly to the content of the game executed in the past. In this way, it is possible to reduce the number of operations that the user needs to do in a case where the user wishes to execute a game by setting content of items similarly to the content of items at the time when the game was executed in the past.

Further, according to the game device 10, for example, it is possible to set initial content of items similarly to the content of the game executed last time. In this way, it is possible to reduce the number of operations that the user needs to do in a case where the user wishes to execute a game by setting content of items similarly to the content of items at the time when the game was executed last time.

Further, according to the game device 10, in a case where the last content of a plurality of pieces of the content is set as the content of the specified item, it is possible to change the content of the specified item to the first content of the plurality of pieces of the content in response to a second operation. As such, the user can change the content of the specified item to the desired content again by repeating the second operation or continuously performing the second operation.

[5. Modification]

The present invention is not to be limited to the above described embodiment.

[1] In the above example, the case is discussed in which a game is executed by a single game device 10, although a game may be executed by the game device 10 communicating a game server. In other words, the present invention can be applied to a game system 1 as shown in FIG. 16, for example.

Figure 16:
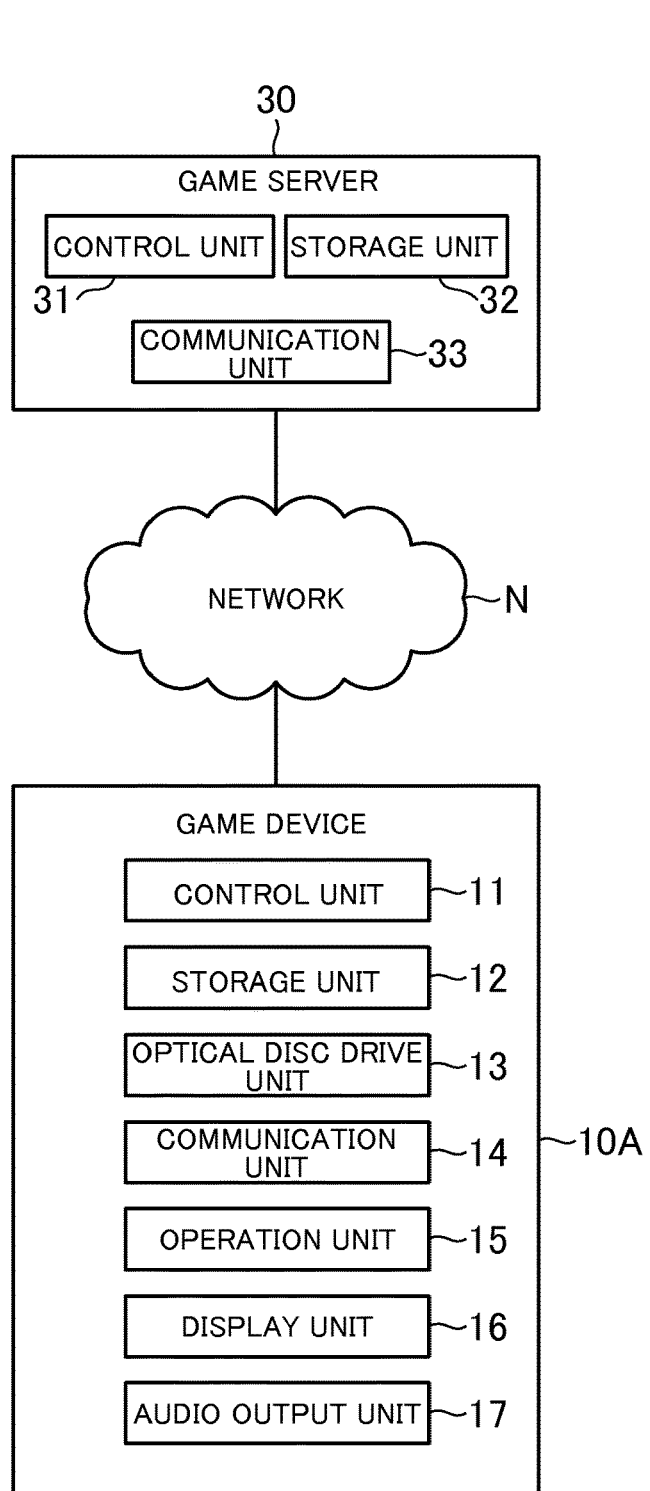
FIG. 16 is a diagram illustrating an overall configuration of the game system.

The game system 1 shown in FIG. 16 includes a game server 30 and a game device 10A. The game server 30 corresponds to an example of the game control device. The game server 30 and the game device 10A are connected to a network N. As such, data communication can be performed between the game server 30 and the game device 10A.

The game server 30 is implemented by, for example, a server computer. As shown in FIG. 16, the game server 30 includes a control unit 31, a storage unit 32, and a communication unit 33. The control unit 31 includes, for example, at least one microprocessor, and executes processing in accordance with an operating system and other programs. The storage unit 32 includes a main storage unit (e.g., RAM) and an auxiliary storage unit (e.g., hard disk drive or solid state drive). The communication unit 33 is a unit for data communications through a network N.

The game device 10A may have the same configuration as the game device 10 according to the first embodiment, and thus, will not be described herein.

In the game system 1, a game similar to the game shown in, for example, FIGS. 4 to 10 is executed.

Figure 17:
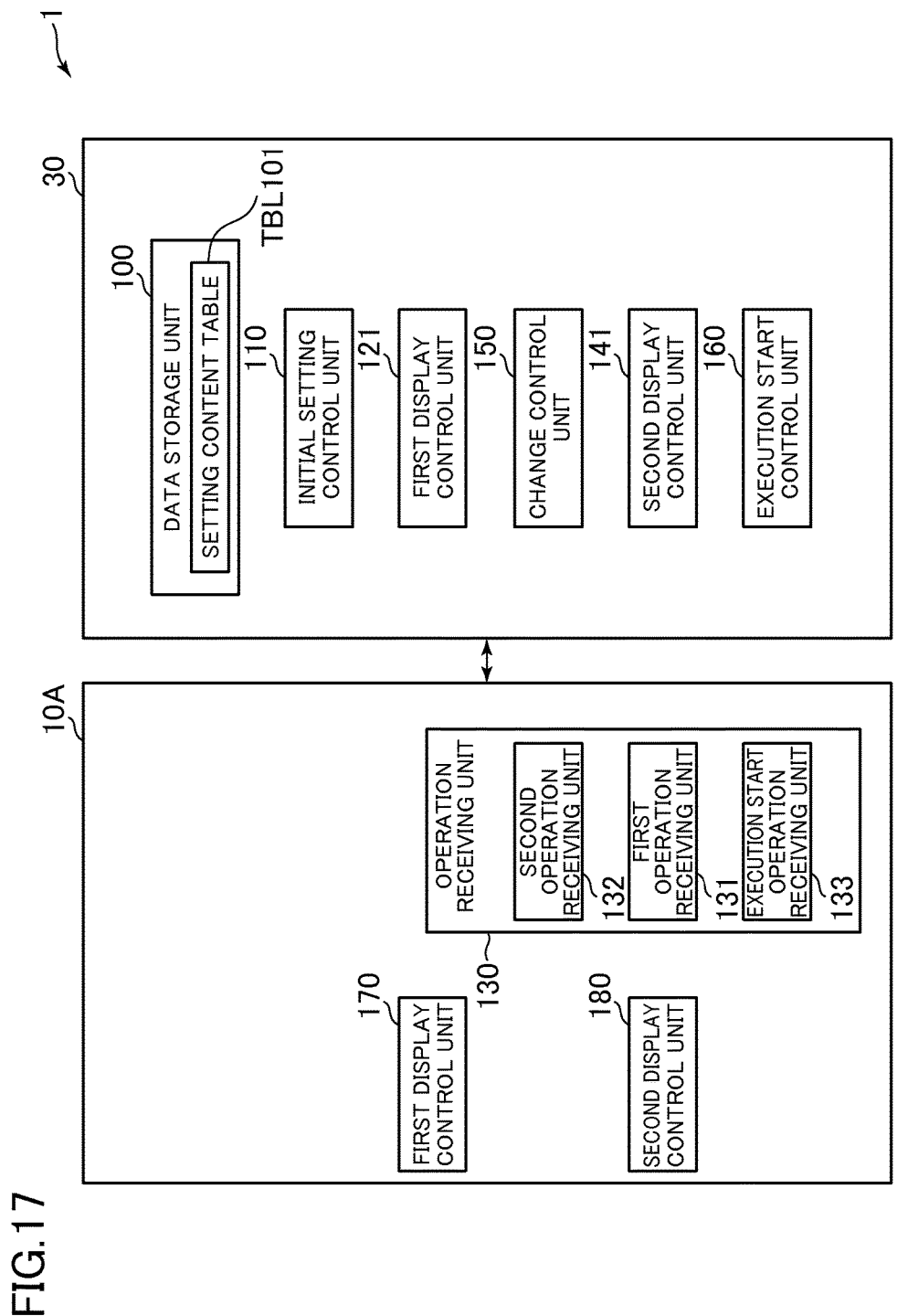
FIG. 17 is a diagram illustrating functions of the game system.

Next, referring to FIG. 17, functions provided to the game system 1 will be discussed. FIG. 17 is a functional block diagram illustrating functions that are implemented in the game system 1 and related to the present invention.

As shown in FIG. 17, the game device 10A functionally includes an operation receiving unit 130, a first display control unit 170, and a second display control unit 180. For example, in the game device 10A, these functions are implemented by the control unit 11 of the game device 10A executing processing according to a program stored in the storage unit 12.

As shown in FIG. 17, the game server 30 functionally includes a data storage unit 100, an initial setting control unit 110, a first display control unit 121, a second display control unit 141, a change control unit 150, and an execution start control unit 160. For example, in the game server 30, these functions are implemented by the control unit 31 of the game server 30 executing processing according to a program stored in the storage unit 32.

The data storage unit 100, the initial setting control unit 110, the operation receiving unit 130, the change control unit 150, and the execution start control unit 160 have the same functions as those described in FIG. 11, and thus, will not be described herein.

In this regard, in FIG. 17, data of an operation received at the operation receiving unit 130 is sent to the game server 30. That is, the first operation receiving unit 131 sends the data indicating the received first operation to the second display control unit 141. The second operation receiving unit 132 sends the data indicating the received second operation to the change control unit 150. The execution start operation receiving unit 133 sends the data indicating the received execution start operation to the execution start control unit 160.

In FIG. 17, the first display control unit 121 and the first display control unit 170 cooperate each other, and thereby implementing the same functions as the first display control unit 120 in FIG. 11. Specifically, the first display control unit 121 is mainly responsible for functions for generating data of a screen among the functions that the first display control unit 120 has, and the first display control unit 170 is mainly responsible for functions for displaying the screen on the display unit 16 based on the data of the screen among the functions that the first display control unit 120 has. That is, the first display control unit 121 generates data of an item selecting screen and sends the generated data to the first display control unit 170 of the game device 10A so that the item selecting screen is displayed on the display unit 16 of the game device 10A. Further, the first display control unit 170 displays the item selecting screen on the display unit 16 based on the data of the item selecting screen received from the first display control unit 121.

In FIG. 17, the second display control unit 141 and the second display control unit 180 cooperate each other, and thereby implementing the same functions as the second display control unit 140 in FIG. 11. Specifically, the second display control unit 141 is mainly responsible for functions for generating data of a screen among the functions that the second display control unit 140 has, and the second display control unit 180 is mainly responsible for functions for displaying the screen on the display unit 16 based on the data of the screen among the functions that the second display control unit 140 has. That is, the second display control unit 141 generates data of a setting screen and sends the generated data to the second display control unit 180 of the game device 10A so that the setting screen is displayed on the display unit 16 of the game device 10A. Further, the second display control unit 180 displays the setting screen on the display unit 16 based on the data of the setting screen received from the second display control unit 141.

The game system 1 provides the same effect as the game device 10.

[2] For example, the game device 10 may also be implemented by a portable game device.

Figure 18:
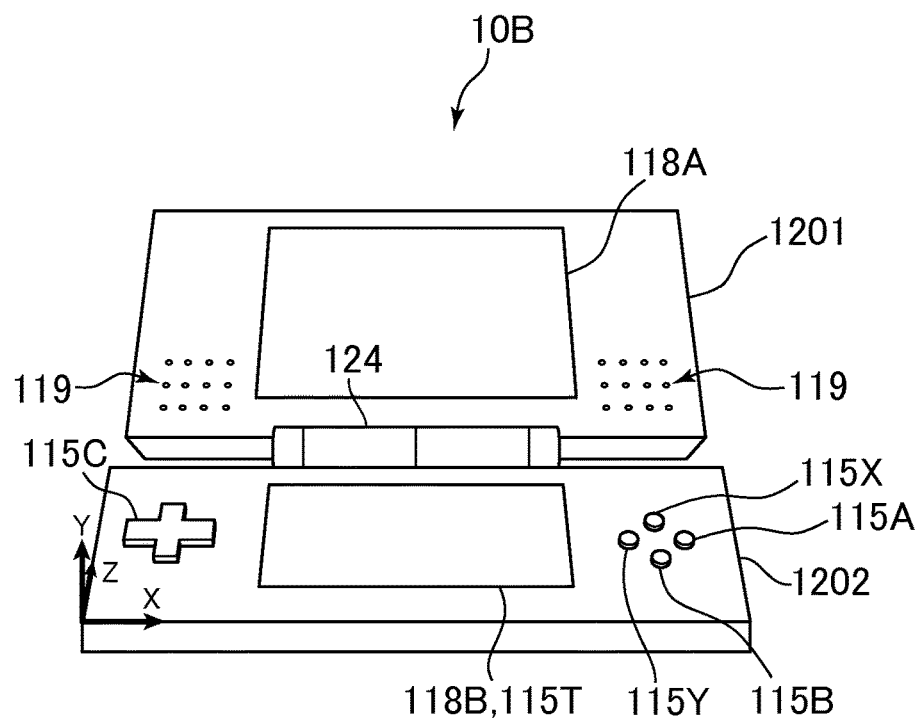
FIG. 18 is a diagram illustrating a perspective view of the game device (portable game machine).
Figure 19:
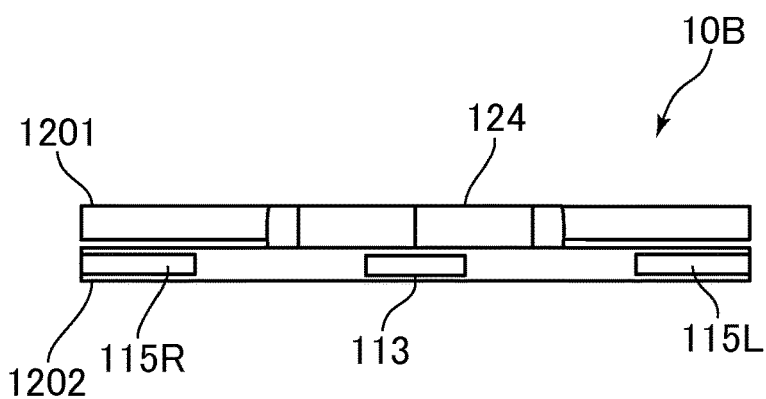
FIG. 19 is a diagram illustrating a side view of the game device (portable game machine).

FIGS. 18 and 19 are diagrams illustrating examples of external views of the game device 10B. FIG. 18 is diagram illustrating a perspective view of the game device 10B viewed from the front. As shown in FIG. 18, the game device 10B includes a first casing 1201 and a second casing 1202. The first casing 1201 and the second casing 1202 are connected to each other via a hinge 124.

The first casing 1201 includes a first display unit 118A and an audio output unit 119. The second casing 1202 includes a direction button 115C and buttons 115A, 115B, 115X, and 115Y. The direction button 115C is used for instructing directions, for example. The buttons 115A, 115B, 115X, and 115Y are used for various operations. The second casing 1202 includes a second display unit 118B and a touch panel 115T disposed on the second display unit 118B. The touch panel 115T is used for specifying a position in the screen displayed on the second display unit 118B, for example.

FIG. 19 is a diagram illustrating a rearview of the game device 10B in a folded state, which is a state in which surfaces of the first casing 1201 and the second casing 1202 are overlapped each other. As shown in FIG. 19, the buttons 115L and 115R are placed on the left and right sides of the back (back side surface) of the second casing 1202. The second casing 1202 has a memory card slot 113 capable of housing a game memory card, which is an information storage medium, on the center of the back surface.

Regarding the game device 10B, for example, the button 115L corresponds to the "L1" button of the game controller 15, and the button 115R corresponds to the "R1" button of the game controller 15. For example, regarding the game device 10B, an example of the "second operation" corresponds to an operation to press the button 115L or the button 115R in a state where the setting menu screen G1021 shown in FIGS. 5, 8, and 9 is displayed on the first display unit 118A or the second display unit 118B.

[3] For example, a game executed in the game devices 10 and 10B and the game system 1 may be a game other than a soccer game. That is, the present invention may be applicable to a game other than a soccer game. For example, the present invention can be applied to sports games other than a soccer game, such as games of baseball, basketball, American football, ice hockey, and rugby. Further, for example, the present invention can be applied to a game other than a sports game. [4] For example, the above embodiment and the variations [1] to [3] may be combined appropriately.

[6. Appendixes]

From the foregoing, the present invention will be understood as described below, for example. In the following, although the numerals given in accompanying drawings are shown in parentheses for the purpose of easier understanding, the invention is not limited to an embodiment shown in the drawings.

1) A game control device (10,10B,30) according to an embodiment of the present invention includes first display control means (120) configured to display an item selecting screen (e.g., G1021-G1023), which receives a selection of at least one of a plurality of items (e.g., P201-P206), on display means (16), and second display control means (140) configured to display a setting screen (e.g., G103) on the display means in response to a first operation (e.g., to press button 23B) for selecting at least one of the items in a case where the item selecting screen is being displayed, the setting screen receiving a change of content of the selected item. The item selecting screen includes an area (e.g., A202-A204) displaying information on content of a specified item (e.g., stadium) among the plurality of items. The game control device (10,10B,30) further includes change control means (150) configured to change the content of the specified item displayed on the area in response to a second operation (e.g., pressing buttons 25R and 25L) different from the first operation (button 23B), in a case where the item selecting screen is being displayed.

2) A method for controlling a game device (10, 10B, 30) according to an embodiment of the present invention includes a first display control step (e.g., S102) for displaying an item selecting screen, which receives a selection of at least one of a plurality of items (e.g., P201-P206), on display means, and a second display control step (e.g., S150) for displaying a setting screen on the display means in response to a first operation (e.g., pressing button 23B) for selecting at least one of the items in a case where the item selecting screen is being displayed, the setting screen receiving a change of content of the selected item. The item selecting screen includes an area (e.g., A202-A204) displaying information on content of a specified item (e.g., stadium) among the plurality of items. The method for controlling the game device (10, 10B, 30) further includes a change control step (S106) for changing the content of the specified item displayed on the area in response to a second operation (e.g., to press buttons 25R and 25L) different from the first operation, in a case where the item selecting screen is being displayed.

3) A game system (1) according to an embodiment of the present invention includes first display control means (120) for displaying an item selecting screen (e.g., G1021-G1023), which receives a selection of at least one of a plurality of items (e.g., P201-P206), on display means (16), and second display control means (140) for displaying a setting screen (e.g., G103) on the display means in response to a first operation (e.g., to press button 23B) for selecting at least one of the items in a case where the item selecting screen is being displayed, the setting screen receiving a change of content of the selected item. The item selecting screen includes an area (e.g., A202-A204) displaying information on content of a specified item (e.g., stadium) among the plurality of items. The game system (1) further includes change control means (150) for changing the content of the specified item displayed on the area in response to a second operation (e.g., to press buttons 25R and 25L) different from the first operation, in a case where the item selecting screen is being displayed.

4) A method for controlling a game system (1) according to an embodiment of the present invention includes a first display control step (e.g., S102) for displaying an item selecting screen (e.g., G1021-G1023), which receives a selection of at least one of a plurality of items (e.g., P201-P206), on display means, and a second display control step (e.g., S150) for displaying a setting screen (e.g., G103) on the display means in response to a first operation (e.g., to press button 23B) for selecting at least one of the items in a case where the item selecting screen is being displayed, the setting screen receiving a change of content of the selected item. The item selecting screen includes an area (e.g., A202-A204) displaying information on content of a specified item (e.g., stadium) among the plurality of items. The method for controlling the game system (1) further includes a change control step (S106) for changing the content of the specified item displayed on the area in response to a second operation (e.g., pressing buttons 25R and 25L) different from the first operation, in a case where the item selecting screen is being displayed.

5) A program according to an embodiment of the present invention causes a computer to function as first display control means (120) for displaying an item selecting screen (e.g., G1021-G1023), which receives a selection of at least one of a plurality of items (e.g., P201-P206), on display means (16), and second display control means (140) for displaying a setting screen (e.g., G103) on the display means in response to a first operation (e.g., to press button 23B) for selecting at least one of the items in a case where the item selecting screen is being displayed, the setting screen receiving a change of content of the selected item. The item selecting screen includes an area (e.g., A202-A204) displaying information on content of a specified item (e.g., stadium) among the plurality of items. The program further causes the computer to function as change control means (150) for changing the content of the specified item displayed on the area in response to a second operation (e.g., to press buttons 25R and 25L) different from the first operation (button 23B), in a case where the item selecting screen is being displayed.

6) An information storage medium according to an embodiment of the present invention is a computer-readable information storage medium storing the program described in the above 5).

According to the embodiment of the present invention described in the above 1) to 6), the item selecting screen, which is originally a screen that receives a selection of at least one of a plurality of items, displays information on content of the specified item of the plurality of items in a case where the item selecting screen is displayed, and the content of the specified item is changed according to the second operation, which is different from the first operation for selecting at least one of the items. According to the embodiment of the present invention described above, in principle, content of an item needs to be changed on the setting screen, which is displayed by selecting the item on the item selecting screen. However, content of the specified item can be changed on the item selecting screen without displaying the setting screen. As such, according to the embodiment of the present invention described above, it is possible to reduce the number of operations that a user needs to perform when changing content of the specified item.

7) According to an embodiment of the present invention, in the game control device (10, 10B, 30) described in the above 1), the item selecting screen (e.g., G1021-G1023) may be a screen that is displayed before execution of a game is started and receives an instruction (e.g., to select P202) to start the game, and the game control device (10, 10B, 30) may further include execution start control means (160) for performing control to start execution of the game in response to the operation for instructing to start execution of the game based on content of the plurality of items, in a case where the item selecting screen is displayed.

According to the game control device (10, 10B, 30) described in the above 7), it is possible to perform both of changing content of the specified item and instructing to start execution of a game ion on the item selecting screen, which is originally a screen that receives a selection of at least one of a plurality of items. It is possible to change content of the specified item on the item selecting screen without displaying the setting screen, and also instruct to start execution of a game on the item selecting screen. As such, the number of operations that a user needs to do in order to change content of the specified item and start execution of a game can be reduced. In other words, the user can quickly change content of the specified item and start execution of a game.

8) According to an embodiment of the present invention, the game control device (10, 10B, 30) described in 1) or 7) may include initial setting control means (110) for setting initial content of the plurality of items based on content of the plurality of items at a time when the game was executed in the past.

According to the game control device (10, 10B, 30) described in 8), initial content of the plurality of items is set based on content of the plurality of items at a time when the game was executed in the past. When executing a game, a user may wish to set content of the items similarly to the content of the items at the time when the game was executed in the past. In the manner described above, for example, it is possible to set content of the items similarly to the content of the items at the time when the game was executed in the past. In this case, the user who wishes to set content of the items similarly to the content of the items at the time when the game was executed in the past does not need to change content of the items. That is, it is possible to reduce the number of operations that the user needs to do when the user wishes to set content of the items similarly to the content of the items at the time when the game was executed in the past.

9) According to an embodiment of the present invention, in the game control device (10, 10B, 30) described in 8), the initial setting control means (110) may set initial content of the plurality of items based on content of the plurality of items at a time when the game was executed last time.

According to the game control device (10, 10B, 30) described in 9), initial content of the plurality of items is set based on content of the plurality of items at a time when the game was executed last time. When executing a game, a user may wish to set content of the items similarly to the content of the items at the time when the game was executed last time. In the manner described above, for example, it is possible to set content of the items similarly to the content of the items at the time when the game was executed last time. In this case, the user who wishes to set content of the items similarly to the content of the items at the time when the game was executed last time does not need to change content of the items. That is, it is possible to reduce the number of operations that the user needs to do when the user wishes to set content of the items similarly to the content of the items at the time when the game was executed last time.

10) According to an embodiment of the present invention, in the game control device (10, 10B, 30) described in any one of 1) and 7) to 9), the change control means (150) may include switching means for switching the content of the specified item (e.g., stadium) to one of a plurality of predetermined pieces of content in a predetermined order in response to the second operation (e.g., pressing buttons 25R and 25L), and the switching means may include means for changing, in a case where the last piece of the plurality of pieces of content is set as the content of the specified item, the content of the specified item to the first piece of the plurality of pieces of content of the specified item in response to the second operation.

According to the embodiment described in 10), in response to the second operation, the content of the specified item is switched to one of a plurality of predetermined pieces of content in a predetermined order. In this case, when a user performs the second operation in error in a state where the content of the specified item is set to the desired content, the content of the specified item may be changed to content that is later than the desired content (i.e., the desired content may pass through). In this regard, according to the above embodiment, in a case where the last piece of the plurality of pieces of content is set as the content of the specified item, the content of the specified item is changed to the first piece of the plurality of pieces of content of the specified item in response to the second operation. As such, the user repeats the second operation (alternatively, the user continues to perform the second operation), thereby setting the content of the specified item to the desired content again.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game control device comprising:
a memory which includes instructions; and
a processor which is configured to execute the instruction stored in the memory to:
display an item selecting screen, which receives a selection of at least one of a plurality of items, on a display,
display a setting screen on the display unit in response to a first operation for selecting at least one of the items in a case where the item selecting screen is being displayed, the setting screen being displayed following the item selecting screen and the setting screen receiving a change of content of the selected item,
wherein the item selecting screen includes an area displaying information on content of a specified item among the plurality of items,
wherein the processor:
changes the content of the specified item displayed on the area in response to a second operation that is different from the first operation, in a case where the item selecting screen is being displayed; and
changes the content of the selected item, which is different from the specified item, is made by a third operation, while the setting screen is being displayed, without going back to the item selecting screen, following the item selecting screen, the third operation being different from the first operation and the second operation.

2. The game control device according to claim 1,
wherein the item selecting screen is a screen that is displayed before execution of a game is started and receives an instruction to start the game, and
wherein the processor is configured to perform control to start execution of the game in response to the operation for instructing to start execution of the game based on content of the plurality of items, in a case where the item selecting screen is displayed.

3. The game control device according to claim 1, wherein the processor is configured to set initial content of the plurality of items based on content of the plurality of items at a time when the game was executed in a past.

4. The game control device according to claim 3, wherein the processor is configured to set the initial content of the plurality of items based on content of the plurality of items at a time when the game was executed last time.

5. The game control device according to claim 1,
wherein the processor is configured to switch the content of the specified item to one of a plurality of predetermined pieces of content according to a predetermined order in response to the second operation, and
wherein the processor is configured to change, in a case where a last piece of the plurality of pieces of content is set as the content of the specified item, the content of the specified item to a first piece of the plurality of pieces of content of the specified item in response to the second operation.

6. A game system comprising:
a memory which includes instructions, and
a processor which is configured to execute the instructions stored in the memory to:
display an item selecting screen, which receives a selection of at least one of a plurality of items, on a display,
display a setting screen on the display in response to a first operation for selecting at least one of the items in a case where the item selecting screen is being displayed, the setting screen being displayed following the item selecting screen and the setting screen receiving a change of content of the selected item,
wherein the item selecting screen includes an area displaying information on content of a specified item among the plurality of items,
wherein the processor:
changes the content of the specified item displayed on the area in response to a second operation that is different from the first operation, in a case where the item selecting screen is being displayed; and
changes the content of the selected item, which is different from the specified item, is made by a third operation, while the setting screen is being displayed, without going back to the item selecting screen, following the item selecting screen, the third operation being different from the first operation and the second operation.

7. A computer-readable information storage medium storing a program that causes a computer to:
display an item selecting screen, which receives a selection of at least one of a plurality of items, on a display unit,
display a setting screen on the display in response to a first operation for selecting at least one of the items in a case where the item selecting screen is being displayed, the setting screen being displayed following the item selecting screen and the setting screen receiving a change of content of the selected item,
wherein the item selecting screen includes an area displaying information on content of a specified item among the plurality of items,
wherein the program causes the computer to:
change the content of the specified item displayed on the area in response to a second operation that is different from the first operation, in a case where the item selecting screen is being displayed; and
change the content of the selected item, which is different from the specified item, is made by a third operation, while the setting screen is being displayed, without going back to the item selecting screen, following the item selecting screen, the third operation being different from the first operation and the second operation.

8. A game control device comprising:
first display control means for displaying an item selecting screen, which receives a selection of at least one of a plurality of items, on display means; and
second display control means for displaying a setting screen on the display means in response to a first operation for selecting at least one of the items in a case where the item selecting screen is being displayed, the setting screen being displayed following the item selecting screen and the setting screen receiving a change of content of the selected item,
wherein the item selecting screen includes an area displaying information on content of a specified item among the plurality of items,
wherein the game control device further comprises:
change control means for changing the content of the specified item displayed on the area in response to a second operation that is different from the first operation, in a case where the item selecting screen is being displayed; and
means for changing the content of the selected item, which is different from the specified item, is made by a third operation, while the setting screen is being displayed, without going back to the item selecting screen, following the item selecting screen, the third operation being different from the first operation and the second operation.

* * * * *